(12) United States Patent
Graves

(10) Patent No.: US 11,364,936 B2
(45) Date of Patent: Jun. 21, 2022

(54) METHOD AND SYSTEM FOR CONTROLLING SAFETY OF EGO AND SOCIAL OBJECTS

(71) Applicant: Daniel Mark Graves, Edmonton (CA)

(72) Inventor: Daniel Mark Graves, Edmonton (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/803,386

(22) Filed: Feb. 27, 2020

(65) Prior Publication Data

US 2020/0276988 A1  Sep. 3, 2020

Related U.S. Application Data

(60) Provisional application No. 62/811,936, filed on Feb. 28, 2019.

(51) Int. Cl.
*B60W 60/00* (2020.01)
*G06N 3/08* (2006.01)

(52) U.S. Cl.
CPC .... *B60W 60/0016* (2020.02); *B60W 60/0011* (2020.02); *B60W 60/0017* (2020.02); *B60W 60/0027* (2020.02); *G06N 3/08* (2013.01)

(58) Field of Classification Search
None
See application file for complete search history.

(56) References Cited

U.S. PATENT DOCUMENTS

| 2009/0012703 A1* | 1/2009 | Aso | G05D 1/0217 701/532 |
|---|---|---|---|
| 2011/0106442 A1 | 5/2011 | Desai et al. | |
| 2012/0078498 A1 | 3/2012 | Iwasaki et al. | |
| 2015/0142299 A1 | 5/2015 | Shin et al. | |
| 2016/0075335 A1 | 3/2016 | Arndt et al. | |

(Continued)

FOREIGN PATENT DOCUMENTS

| CN | 102449672 A | 5/2012 |
|---|---|---|
| CN | 104648395 A | 5/2015 |

(Continued)

OTHER PUBLICATIONS

S. Magdici and M. Althoff, "Adaptive Cruise Control with Safety Guarantees for Autonomous Vehicles," in Proc. World Congress Intl. Fed. of Autonomatic Conlrol, 2017.

(Continued)

*Primary Examiner* — James J Lee
*Assistant Examiner* — Tawri M Matsushige

(57) ABSTRACT

A method or system for controlling safety of both an ego vehicle and social objects in an environment of the ego vehicle, comprising: receiving data representative of at least one social object and determining a current state of the ego vehicle based on sensor data; predicting an ego safety value corresponding to the ego vehicle, for each possible behavior action in a set of possible behavior actions, based on the current state; predicting a social safety value corresponding to the at least one social object in the environment of the ego vehicle, based on the current state, for each possible behavior action; and selecting a next behavior action for the ego vehicle, based on the ego safety values, the social safety values, and one or more target objectives for the ego vehicle.

17 Claims, 10 Drawing Sheets

(56) References Cited

U.S. PATENT DOCUMENTS

| | | | |
|---|---|---|---|
| 2017/0249844 A1* | 8/2017 | Perkins | B60W 40/00 |
| 2017/0277194 A1* | 9/2017 | Frazzoli | B60W 60/0015 |
| 2018/0086336 A1 | 3/2018 | Jones et al. | |
| 2018/0284785 A1* | 10/2018 | Berntorp | G08G 1/0112 |
| 2018/0374341 A1 | 12/2018 | Branson et al. | |
| 2019/0051179 A1* | 2/2019 | Alvarez | H04W 12/63 |
| 2019/0101917 A1* | 4/2019 | Yao | B60W 50/0097 |
| 2019/0113918 A1* | 4/2019 | Englard | G05D 1/024 |
| 2019/0329772 A1 | 10/2019 | Graves | |
| 2020/0249674 A1* | 8/2020 | Dally | G06N 3/08 |

FOREIGN PATENT DOCUMENTS

| | | |
|---|---|---|
| CN | 105416289 A | 3/2016 |
| DE | 102016007899 A1 | 12/2017 |

OTHER PUBLICATIONS

D. Moser, R. Schmied, H. Waschl and L. d. Re, "Flexible spacing adaptive cruise conlrol using stochastic model predictive control," IEEE Transactions on Control Systems Technology, vol. 26, No. 1, Jan. 2018.

D. Moser, L. d. Re and S. Jones, "A risk constrained control approach for adaptive cruise control," in IEEE Conf. on Control Technology and Applications, Kohala Coast, Hawai'i, USA, 2017.

D. Zhao, B. Wang and D. Liu, "A supervised actor-critic approach for adaptive cruise control," Soft Computing, vol. 17, pp. 2089-2099, 2013.

R. Sutton, J. Modayil, M. Delp, T. Degris, P. Pilarski, A. White and D. Precup, "Horde: A scalable real-time architecture for learning knowledge from unsupervised sensorimotor interaction," in Proc. of 10th Intl. COnf. on Autonomous Agents and Multiagent Systems, Taipei, Taiwan, 2011.

D. Silver, A. Huang, C. Maddison, A. Guez, L. Sifre, G. Driessche, J. Schrittwieser, I. Antonoglou and V. Panneershelvam, "Mastering the game of Go with deep neural networks and tree search," Nature, vol. 529, No. 7587, pp. 484-489, 2016.

M. C. G. d. Silva, "Measurements of comfort in vehicles," Measurement Science and Technology, vol. 13, 2002.

E. F. Camacho and C. Bordons, Model Predictive Control, Springer, 2007.

J. Redmon et al. You Only Look Once: Unified, Real-Time, Object Detection; arXiv:1506.02640 [cs.CV], 2016.

David Fernandez Llorca et al., "Autonomous Pedestrian Collision Avoidance Using a Fuzzy Steering Controller", 12pages. Feb. 17, 2011.

\* cited by examiner

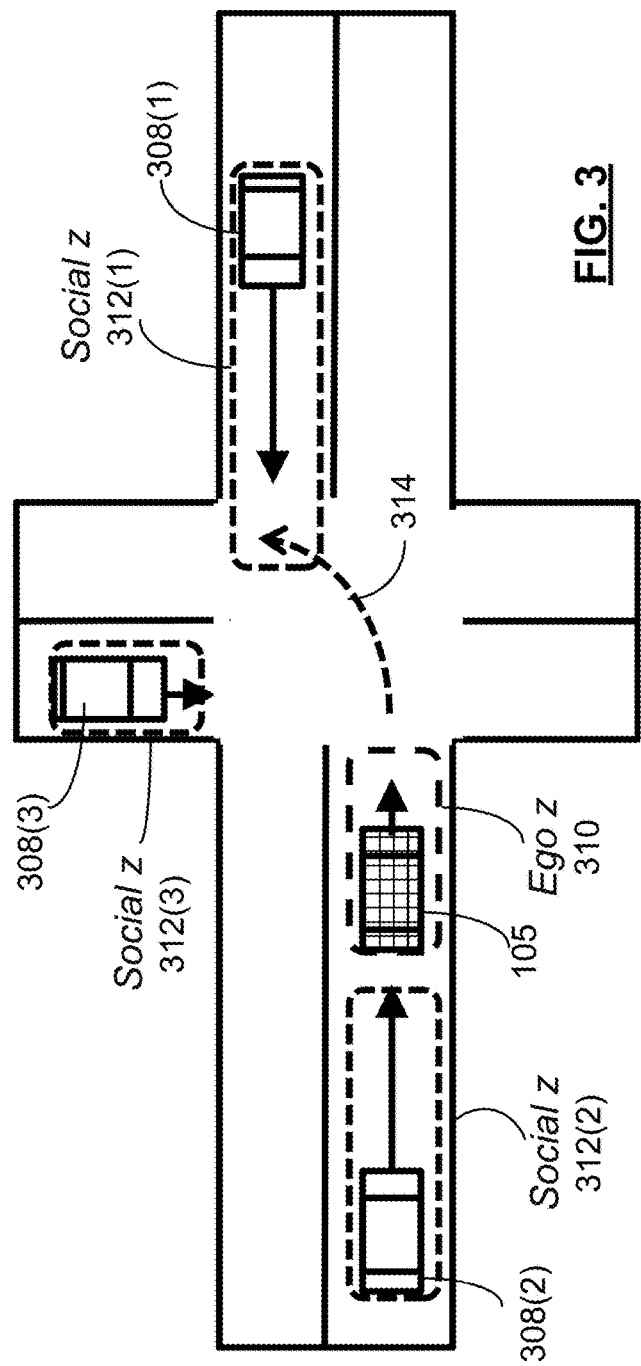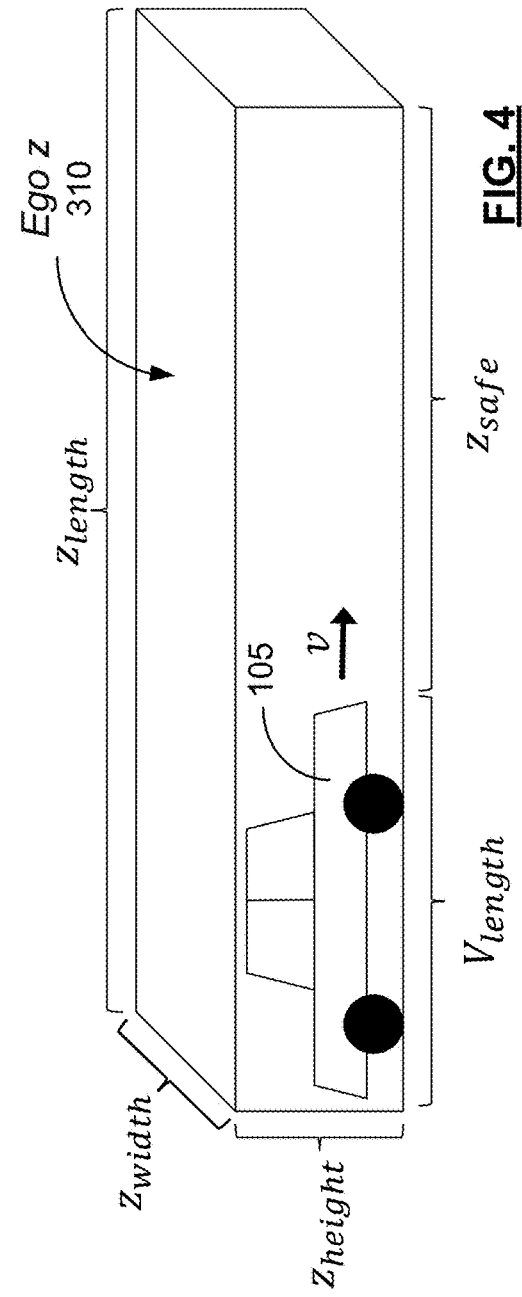

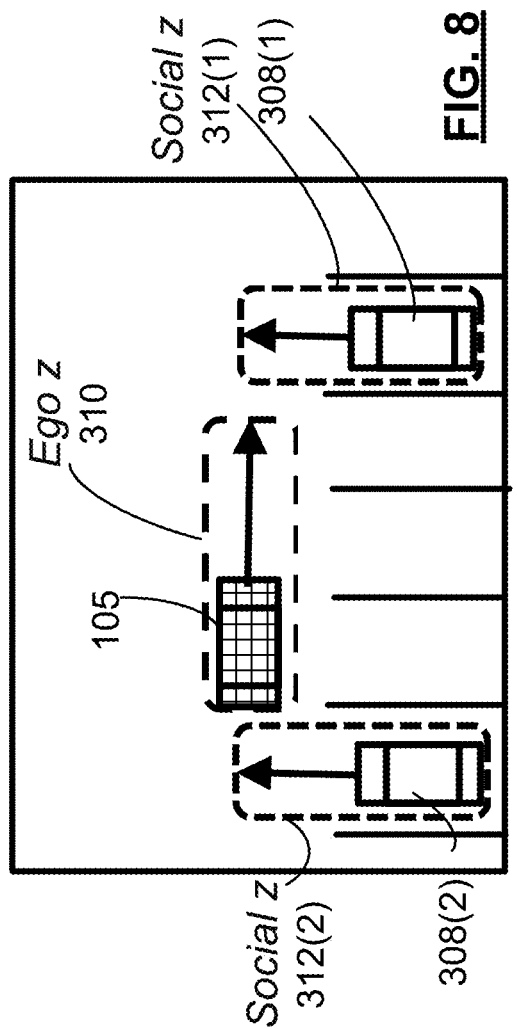
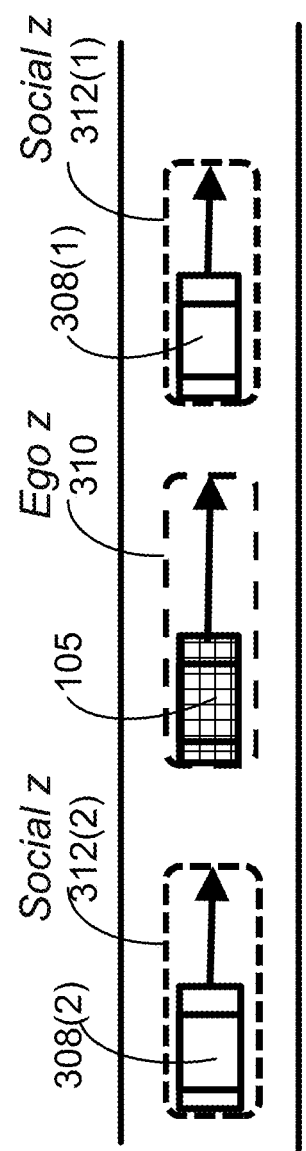

METHOD AND SYSTEM FOR CONTROLLING SAFETY OF EGO AND SOCIAL OBJECTS

RELATED APPLICATIONS

The present application claims the benefit of and priority to U.S. Provisional Patent Application No. 62/811,936 filed Feb. 28, 2019, entitled "METHOD AND SYSTEM FOR CONTROLLING SAFETY OF EGO AND SOCIAL OBJECTS", the contents of which are incorporated herein by reference.

TECHNICAL FIELD

The present disclosure relates to systems for controlling safety of vehicles and surrounding objects.

BACKGROUND

Safety is a critical objective of autonomous driving systems (ADS) and advanced driver assistance systems (ADAS), including both the safety of the occupants of the controlled vehicles as well as the safety of others who are in the vicinity of such vehicles. In this regard, safety can be classed into two categories, namely egocentric or "ego" safety which is the safety of the controlled vehicle (e.g. the ego vehicle) and its occupants and "social" safety which is the safety of other objects that are acting within the environment of the ego vehicle.

Some ADS and ADAS solutions employ a controlling agent for the ego-vehicle that has been trained using reinforcement learning (RL) techniques. However, known RL techniques tend to be inherently egocentric. Multi-agent RL approaches may be used to account for the behavior of the agents controlling other objects, however such approaches can be inaccurate due to difficulties in determining or understanding the policy of the agents controlling the other objects. For example, it is difficult to determine if the driver of another vehicle is paying attention.

For the foregoing and other reasons, improvements in systems that that protect the safety of both an ego vehicle and its occupants as well as other objects acting in the ego vehicle's environment.

SUMMARY

According to a first example aspect is a method for controlling safety of both an ego vehicle and at least one social objects in an environment the ego vehicle is operating in. The method includes receiving data representative of at least one social object and determining a current state of the ego vehicle based on sensor data An ego safety value is predicted corresponding to the ego vehicle, for each possible behavior action in a set of possible behavior actions, based on the current state. A social safety value corresponding to the at least one social object in the environment of the ego vehicle is predicted, based on the current state, for each possible behavior action. A next behavior action for the ego vehicle is selected, based on the ego safety values, the social safety values, and one or more target objectives for the ego vehicle.

In at least some examples of the first aspect, for each possible behavior action the ego safety value indicates a probability that an obstacle will not be located in an ego safety zone of the ego vehicle if the possible behavior action is performed by the ego vehicle and the target policy followed thereafter. The social safety value indicates a probability, for the at least one social object, that the ego vehicle will not be located in a social safety zone of the social object if the possible behavior action is performed by the ego vehicle and the target policy followed thereafter.

In at least some examples of the preceding aspects, the data received includes data representative of a plurality of social objects in the environment of the ego vehicle. In such examples, the method includes, for each possible behavior action, predicting a respective social safety value for each of the plurality of social objects, each social safety value indicating a probability that the ego vehicle will not be located in a respective social safety zone of the respective social object if the possible behavior action is performed by the ego vehicle and the target policy followed thereafter.

In at least some examples of the preceding aspects, determining the current state comprises determining a velocity and direction of the ego vehicle, and a velocity, direction and position of each of the plurality of social objects.

In at least some examples of the preceding aspects, predicting the ego safety value for each possible behavior action is performed by a general value function (GVF) implemented by a trained neural network. Predicting the social safety value for each possible behavior action for each of the plurality of social objects is performed by a further GVF implemented by a trained neural network.

In at least some examples of the preceding aspects, the ego safety zone includes a physical space that includes and extends beyond the ego vehicle in a direction of travel of the ego vehicle, and the social safety zone for a social object 308 includes and extends beyond the social object in a direction of travel of the social object.

In at least some examples of the first aspect, for each possible behavior action, the social safety value corresponds to a plurality of social objects in the environment of the ego vehicle, the social safety value indicating a probability that the ego vehicle will not be located in a respective social safety zone of any of the social objects if the possible behavior action is performed by the ego vehicle and the target policy followed thereafter.

In at least some examples of the preceding aspects, selecting the behavior action includes performing fuzzification of the ego safety value and the social safety value predicted for each of the possible behavior actions by mapping each of the ego safety values and the social safety values to a respective truth value; applying fuzzy inference on the truth values to generate a goal fuzzy set; and defuzzifying the goal fuzzy set to select the behavior action for the ego vehicle.

A predictive safety control system is disclosed according to a second example aspect. The predictive safety control system includes a state module configured to determine a current state based on sensor data, and an ego safety predictor module configured to predict, based on the current state, for each possible behavior action in a set of possible behavior actions generated by an action module, an ego safety value corresponding to the ego vehicle. The predictive safety control system also includes a social safety predictor module configured to predict, based on the current state, for each of the possible behavior actions, a social safety value corresponding to at least one social object in an environment of the ego vehicle. A safety controller is configured to select, based on the ego safety values, the social safety values predicted for each of the possible behavior actions, and one or more target objectives, a next behavior action for ego vehicle.

In example embodiments, the systems and methods disclosed herein may in some circumstances reduce the safety risk of behavior actions taken at the ego vehicle on social objects such as other vehicles and pedestrians. The systems and methods of the present disclosure considers not only the safety of an ego vehicle, but also the safety of social objects. Social safety predictions and ego safety predictions as described in et present disclosure may in some applications be applied across a broad spectrum of environments including intersection handling, multi-lane highway driving, parking lots, school zones, and other complicated environments where the need for social safety is highly important. In some examples, social safety and ego safety can be considered as separate components, thereby making it possible to assign different prioritize these safeties in an automated decision making process.

BRIEF DESCRIPTION OF THE DRAWINGS

FIG. 3 is a plan or bird's eye view illustrating an example of an ego vehicle with a corresponding ego safety zone and a plurality of social objects with corresponding social safety zones, approaching a road intersection.

FIG. 4 is a three dimensional illustration of an ego safety zone.

FIG. 8 is a plan or bird's eye view illustrating an example of an ego vehicle with a corresponding ego safety zone and a plurality of social objects with corresponding social safety zones, in a parking lot scenario.

FIG. 9 is a plan or bird's eye view illustrating an example of an ego vehicle with a corresponding ego safety zone and a plurality of social objects with corresponding social safety zones, in a roadway scenario.

DESCRIPTION OF EXAMPLE EMBODIMENTS

Figure 1:
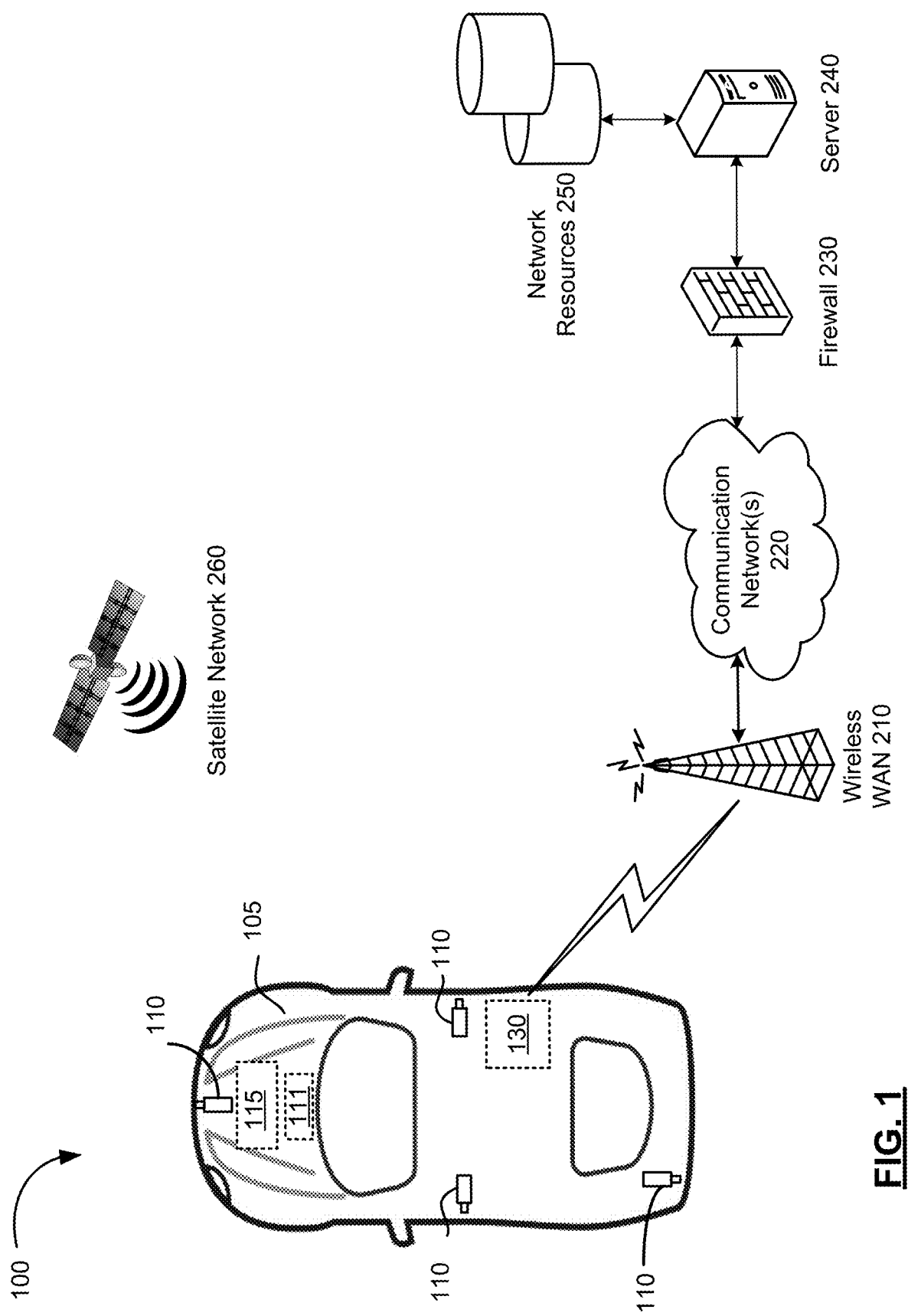
FIG. 1 is a schematic diagram of systems relating to example embodiments of the present disclosure.

The following is a list of selected acronyms and terms and their associated definitions that appear in this description:

| | |
|---|---|
| AC | Action Conditioned |
| ACC | Adaptive Cruise Control |
| Action | A control decision for interacting with the environment realized by actuators |
| ADAS | Advanced Driver-Assistance System |

-continued

| | |
|---|---|
| ADS | Autonomous Driving System |
| FIS | Fuzzy Inference System |
| GVF | General Value Function |
| MPC | Model Predictive Controller |
| MCTS | Monte Carlo Tree Search |
| RL | Reinforcement Learning |
| RPM | Rotations Per Minute |
| State | A representation of the environment constructed from a collection of sensors |
| TD | Temporal Difference |

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other moving objects.

Example embodiments are described for systems and methods that are directed towards enhancing ego safety and social safety in the context of a vehicle that includes an automated driver replacement or driver assistance system such as an ADS or ADAS. In this regard, ego safety refers to the safety of an ego vehicle (i.e. the subject vehicle that is being controlled), and social safety refers to the safety of social objects within the environment of the ego vehicle. As used herein, a social object refers to an object other than the ego vehicle that is active (i.e. moving or dynamic as opposed to fixed in place) in the environment. By way of example, social objects can include non-stationary objects such as, but not limited to, other vehicles, bicycles, scooters, pedestrians and animals. Example embodiments are directed to a behavior planner of a planning system of the ADS (or ADAS), in which the behavior planner is configured to predict the impact of potential behavior actions on the safety of the ego vehicle (e.g. ego safety) as well as on the safety of social objects in the environment of the ego vehicle (e.g. social safety). In example embodiments, a suitable behavior action can be selected based on both the predicted ego safety and the predicted social safety determined for each behavior action in a set of possible behavior actions. Accordingly, in at least some example embodiments the problem of improving safety for both the ego vehicle and social objects is addressed by configuring the behavior planner to consider the impact that particular behavior actions will have not only on the safety of the ego vehicle but also on social objects, and select a suitable behavior action that satisfies safety requirements for both the ego vehicle and the surrounding social objects. In example embodiments, a predictive safety control system of the behavior planner is configured to assess both of the following questions: (a) if a given target policy is followed, will the ego vehicle be safe?; and (b) if the given target policy is followed will the ego vehicle make the social objects unsafe?.

In at least some examples, in addition to ego safety and social safety predictions, ego comfort can also be predicted for different types of behavior actions, and a particular behavior action selected based on the ego safety, social safety, and ego comfort predictions. In this regard, ego comfort corresponds to a degree of physical and/or mental comfort of the occupants of the ego-vehicle. By way of example, a certain behavior action may result in a rate of linear or angular acceleration of an ego vehicle that is safe, but which is physically or mentally uncomfortable for the occupants of the vehicle.

In at least some examples, predictive functions are used to make safety and optionally comfort predictions. These predictive functions may be trained via reinforcement learning (RL) using the general value function (GVF) framework. An example of a GVF framework that can be implemented in example embodiments is described in: "R. Sutton, J. Modayil, M. Delp, T. Degris, P. Pilarski, A. White and D. Precup, "Horde: A scalable real-time architecture for learning knowledge from unsupervised sensorimotor interaction," in *Proc. of 10th Intl. Conf. on Autonomous Agents and Multiagent Systems*, Taipei, Taiwan, 2011." Reinforcement learning (RL) enables a way of dealing with the stochastic and unknown behavior of other vehicles by learning from experience, including observing changes in behavior of other vehicles and the impact that has on safety. An example of RL is described in: D. Silver, A. Huang, C. Maddison, A. Guez, L. Sifre, G. Driessche, J. Schrittwieser, I. Antonoglou and V. Panneershelvam, "Mastering the game of Go with deep neural networks and tree search," *Nature*, vol. 529, no. 7587, pp. 484-489, 2016.

System Overview

Figure 2:
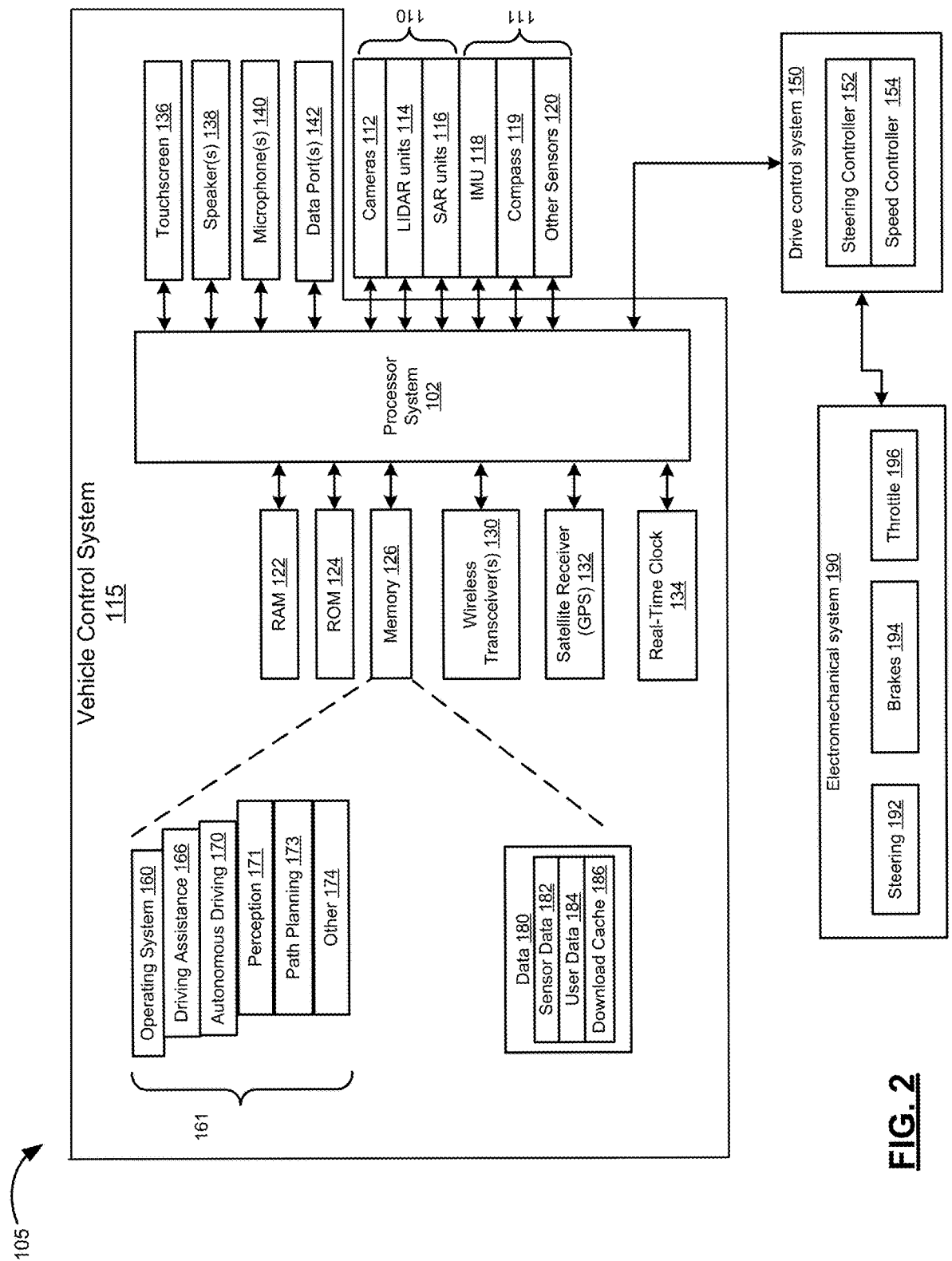
FIG. 2 is a block diagram of a vehicle comprising a vehicle control system in accordance with one example embodiment of the present disclosure.

FIG. 1 is a schematic diagram showing selected elements of a system 100 in which the methods and systems for controlling safety of vehicles and surrounding objects can be implemented according to example embodiments of the present disclosure. The system 100 comprises a vehicle control system 115 embedded in a vehicle 105. The vehicle control system 115, shown in greater detail in FIG. 2, is coupled to a drive control system 150 and an electromechanical system 190 of the vehicle 105, as described below. The vehicle control system 115 can in various embodiments allow the vehicle 105 to be operable in one or more of a fully-autonomous, semi-autonomous or fully user-controlled mode.

The vehicle 105 includes a plurality of environmental sensors 110 that collect information about the external environment surrounding vehicle 105 in which the vehicle 100 operates in, and a plurality of vehicle sensors 111 that collect information about the operating conditions of the vehicle 105. Environment sensors 110 may for example include electromagnetic (EM) wave based sensors such as digital cameras 112, light detection and ranging (LIDAR) units 114, and radar units 116 such as synthetic aperture radar (SAR) units. Cameras 112, LIDAR units 114 and radar units 116 are located about the vehicle 105 and are each coupled to the vehicle control system 115, as described below. In an example embodiment, the digital cameras 112, LIDAR units 114 and SAR units 116 are located at the front, rear, left side and right side of the vehicle 105 to capture information about the environment in front, rear, left side and right side of the vehicle 105. The digital cameras 112, LIDAR units 114 and radar units 116 are mounted or otherwise located to have different fields of view (FOVs) or coverage areas to capture information about the environment surrounding the vehicle 105. In some examples, the FOVs or coverage areas of some or all of the adjacent environmental sensors 110 are partially overlapping. Accordingly, the vehicle control system 115 receives information about the external environment of the vehicle 105 as collected by cameras 112, LIDAR units 114 and radar units 116. In at least some examples, the coverage areas are divided into zones, including for example a front zone, a back zone, and right and left side zones. In at least some examples, one or more of cameras 112, LIDAR units 114 and radar units 116 are configured with on-board processing and can perform pre-processing of collected information before providing the collected information to other systems of the vehicle control system 115 as sensor data 182.

Vehicle sensors 111 can include an inertial measurement unit (IMU) 118, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense information and provide the sensed information to the vehicle control system 115 as sensor data 182 in real-time or near real-time. The vehicle sensors 111 can include an IMU 118 that senses the vehicle's specific force and angular rate using a combination of accelerometers and gyroscopes. The vehicle control system 115 may also collect information about a position and orientation of the vehicle 105 using signals received from a satellite receiver 132 and the IMU 118. The vehicle control system 115 may determine a linear speed, angular speed, acceleration, engine RPMs, transmission gear and tire grip of the vehicle 105, among other factors, using information from one or more of the satellite receivers 132, and the vehicle sensors 111.

The vehicle control system 115 may also comprise one or more wireless transceivers 130 that enable the vehicle control system 115 to exchange data and optionally voice communications with a wireless network such as a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, which may provide supplemental data sources (for example local whether information or information collected by other environment sensors located in the environment the vehicle 105 is operating in, such as sensors located on or integrated into traffic lights, road signs, other vehicles, and the like) that may be used by the vehicle control system 115.

The communication system 100 comprises a satellite network 260 comprising a plurality of satellites in addition to the WAN 210. The vehicle control system 115 comprises the satellite receiver 132 (FIG. 2) that may use signals received by the satellite receiver 132 from the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 2 illustrates selected components of the vehicle 105 in accordance with an example embodiment of the present disclosure. As noted above, the vehicle 105 comprises a vehicle control system 115 that is connected to a drive control system 150 and an electromechanical system 190 as well as to the environmental sensors 110 and vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs), and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

In at least some examples, one or more or the wireless transceivers 130 enable the vehicle control system 115 to receive third party information produced by the vehicle control systems of other vehicles operating in or near an environment of the vehicle control system, which may for example include state information generated in respect of the other vehicles or information about how vehicle 105 is perceived by the other vehicles. In some examples, such information could be communicated through peer-to-peer signaling using a predetermined communications protocol, and in some examples the such information may be provide through an intermediate service (e.g. from a network resource 250).

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 105. The drive control system 150 may for example comprise a steering controller 152, and a speed controller 154, each of which may be implemented as software modules or control blocks within the drive control system 150. The steering controller 152 and speed controller 154, when in fully or semi-autonomous driving mode, receives navigation instructions from an autonomous driving system 170 (for autonomous driving mode) or a driving assistance system 166 (for semi-autonomous driving mode) and generate control signals to control one or more of the steering, braking and throttle of the vehicle 105. The drive control system 150 may include additional components to control other aspects of the vehicle 105 including, for example, control of turn signals and brake lights.

The electromechanical system 190 receives control signals from the drive control system 150 to operate the mechanical components of the vehicle 105. The mechanical system 190 effects physical operation of the vehicle 105. The mechanical system 190 comprises a throttle 196 for controlling power applied to wheels by an engine, a steering system 192 for controlling the direction of the wheels and brakes 194 for applying braking force to the wheels. The engine may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 102. A user may interact with the GUI using the touchscreen and optionally other input devices (e.g., buttons, dials) to select a driving mode for the vehicle 105 (e.g. fully autonomous driving mode or semi-autonomous driving mode) and to display relevant information, such as navigation information, driving information, parking information, media player information, climate control information, etc. The GUI may comprise a series of traversable content-specific menus.

The memory 126 of the vehicle control system 115 has stored thereon sets of software instructions executable by the processor system 102 that configure the vehicle control system 115 to implement a number of systems 161 in addition to the GUI. The systems 161 includes an operating system 160, one or both of driving assistance system 166 for semi-autonomous driving (generally known as an advanced autonomous driver-assistance system (ADAS)), and autonomous driving system (ADS) 170 for fully autonomous driving. Both the driving assistance system 166 and the autonomous driving system 170 can include one or more of a navigation planning and control module, a vehicle localization module, parking assistance module, and autonomous parking module, vehicle state determination module as well as other modules. In example embodiment shown in FIG. 2, the systems 161 include a perception module 171 and a path planning module 173 Systems 161 may also include other modules 174, which may include for example mapping module, navigation module, climate control module, media player module, telephone module and messaging module. In example embodiments the various systems and system modules are configured to interact during operation of the vehicle 105.

Figure 11:
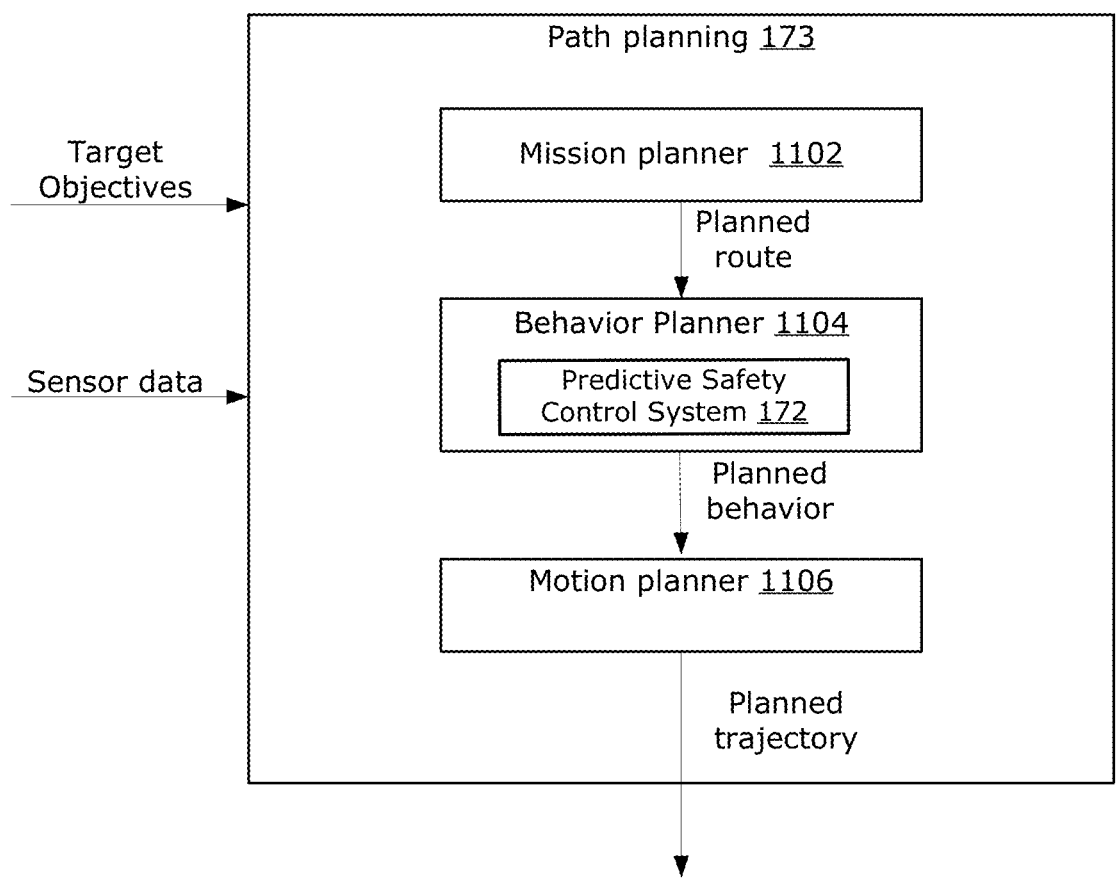
FIG. 11 is a block is a block diagram of the path planning module in accordance with one example embodiment of the present disclosure.

Referring to FIG. 11, the path planning module 173 includes a mission planner 1102, a behavior planner 1104 and a motion planner 1106. The behavior planner 1104 includes a predictive safety control system 172. The predictive safety control system 172 causes the operations of methods described herein to be performed.

Referring again to FIG. 2, the memory 126 also stores a variety of data 180. The data 180 may comprise sensor data 182 received from the sensors 110, user data 184 comprising user preferences, settings and optionally personal media files (e.g., music, videos, directions, etc.), and a download cache 186 comprising data downloaded via the wireless transceivers 130, including for example data downloaded from network resources 250. The sensor data 182 may comprise image data representative of an image from each camera 112, LIDAR data representative of a point cloud from the LIDAR units 114, radar data from the radar units 116, and other sensor data from other vehicle sensors 120. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Path Planning System

Referring again, FIG. 11 is a block diagram that illustrates further details of the path planning module 173. It should be understood that, in some examples involving machine learning, the path planning system 173, or components of the path planning module 173, may be trained outside of the vehicle 105 (e.g., in a simulator system). In examples discussed below, one or more of the mission planner 1102, and the motion planner 1106 may include a neural network that is trained in a simulator.

Generally, path planning may be performed at three levels, namely at the mission level (e.g., performed by the mission planner 1102), at the behavior level (e.g., performed by the behavior planner 1104) and at the motion level (e.g., performed by the motion planner 1106).

Generally, the purpose of path planning is to determine a path for the vehicle 105 to travel from a first state (e.g., defined by the vehicle's current position and orientation, or an expected future position and orientation) to a target state (e.g., a final destination defined by the user). Path planning may also include determining one or more sub-paths to one or more intermediate target states. The path planning module 173 determines the appropriate path and sub-paths with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads).

Path planning performed by the path planning module 173 may be dynamic, and be repeatedly performed as the environment changes. Changes in the environment may be due to movement of the vehicle 105 (e.g., vehicle 105 approaches a newly-detected obstacle) as well as due to the dynamic nature of the environment (e.g., moving pedestrians and other moving vehicles).

As mentioned above, path planning may be performed at different levels, for example at the mission level, behavior level and motion level. Mission level path planning is considered to be a higher (or more global) level of path planning, motion level path planning is considered to be a lower (or more localized) level of path planning, and behavior level path planning is considered to be between mission and motion level. Generally, the output of path planning at a higher level may form at least part of the input for a lower level of path planning.

At each level of planning, the planned path may be defined as a series of points, each point defining a planned target position (e.g., x- and y-coordinates) of the ego vehicle 105. Each point may additionally define the planned speed, orientation, acceleration and/or angular speed of the vehicle 105, thus defining the planned state of the vehicle 105 at each target position. The planned path may thus define a set of locations (or more generally, a set of states) to be travelled by the vehicle 105 in the planned journey.

Path planning at the mission level (more simply referred to as mission planning) relates to planning a path for the autonomous vehicle at a high, or global, level. The first state of the ego vehicle 105 may be the starting point of the journey (e.g., the user's home) and the target state of the ego vehicle 105 may be the final destination point (e.g., the user's workplace). Selecting a route to travel through a set of roads is an example of mission planning. Generally, the final destination point, once set (e.g., by user input) is unchanging through the duration of the journey. Although the final destination point may be unchanging, the path planned by mission planning may change through the duration of the journey. For example, changing traffic conditions may require mission planning to dynamically update the planned path to avoid a congested road. The user may also change the final destination point at any time during the journey.

Input data for mission planner 1102 may include, for example, GPS data (e.g., GPS coordinates that are used to determine the starting point of the ego vehicle 105), geographical map data (e.g., from an internal or external map database), traffic data (e.g., from an external traffic condition monitoring system), the final destination point (e.g., defined as x- and y-coordinates, or defined as longitude and latitude coordinates), as well as any user-defined preferences (e.g., preference to avoid toll roads).

The planned path output from the mission planner 1102 defines the route to be travelled to reach the final destination point from the starting point. The output of the mission planner 1102 may include data defining a set of intermediate target states (or waypoints) along the route. The intermediate target states may be defined at road intersections to indicate which road to take at each intersection, for example. The intermediate target states may be used for path planning at the behavior level.

The behavior planner 1104 includes the predictive safety control system 172. The behavior planner 1104 receives the planned route from the mission planner 1102, including the set of intermediate target states (if any). The behavior planner 1104 generates a planned behavior action for the vehicle 105, in order to make driving decisions on a more localized and short-term basis than the mission planner 1102. For example, the behavior planner 1105 may ensure that the vehicle 105 follows certain behavior rules (e.g., left turns should be made from the left-most lane). In the embodiment shown in FIG. 11, the predictive safety control system 172 is a sub-system of the behavior planner 1104 that includes instructions that are executable by a processor, such as the processor 102 of the vehicle control system 115. The predictive safety control system 172 may be invoked by the behavior planner 1104 to cause execution of the instructions of the predictive safety control system 172. When the instructions of the predictive safety control system 172 are executed by the processor 102 of the vehicle control system 115, the predictive safety control system 172 selects a behavior action. The behavior planner 11014 receives the selected behavior action from the predictive safety control system 172 to enable the behavior planner 1104 to generate a planned behavior action for the vehicle 105 that meets the target objectives.

The planned behavior action is received by the motion planner 1106. As will be discussed further below, the planned behavior action may be received by the motion planner 1106 as state input data. The motion planner 1106 should find a trajectory that satisfies the planned behavior action, and that navigates the environment in a relatively safe, comfortable, and speedy way. The motion planner 1106 provides a safe and robust navigation of the vehicle 105 in both structured and unstructured environments. A structured environment is generally an environment having well-defined drivable and non-drivable areas (e.g., a highway having clear lane markings), and which may have defined driving rules that all vehicles are expected to follow. An unstructured environment is generally an environment in which drivable and non-drivable areas are less defined (or undefined) (e.g., an open field), and which may have fewer or no driving rules for expected vehicle behavior. Regardless of whether the environment is structured or unstructured, the environment may also be highly dynamic (e.g., pedestrians and other vehicles are each moving) and each dynamic obstacle may have different and independent behaviors.

Predictive Safety Control System

In example embodiments, the behavior planner 1104 includes the predictive safety control system 172. The predictive safety control system 172 of vehicle control system 115 of vehicle 105 is configured to predict the effect that particular behavior actions will have on the safety of the vehicle 105 (referred to hereinafter as ego vehicle 105) as well as on other social objects acting within the environment of the ego vehicle 105 and select a suitable behavior action that addresses safety requirements for both the ego vehicle 105 and the surrounding social objects.

In this regard, in example embodiments the predictive safety control system 172 is configured to define one or more ego safety zones z around ego vehicle 105 and one or more social safety zones z around any surrounding social objects, and select behavior actions with the objective of keeping social objects out of the ego-vehicle's safety zone(s) z and keeping the ego-vehicle out of the safety zones z of any of the social objects. An ego safety zone z is a physical space that extends beyond the dimensions of ego vehicle 105 in at least one direction, and a social safety zone z for a social object is a physical space that extends beyond the dimensions of that social object in at least one direction.

For illustrative purposes, FIG. 3 shows, from a bird's eye view, ego vehicle 105 approaching an intersection along with three social objects 308(1) 308(2) and 308(3) (referred to collectively or generically as social object(s) 308). In FIG. 3, the social objects 308 are all shown as vehicles, however the social objects may also include other types of active objects such as cyclists, pedestrians and animals.

As can be seen in FIG. 3, dashed lines are used to indicate direction of travel safety zones defined for each of the vehicles by predictive safety control system 172. In particular, a direction of travel ego safety zone z 310 is shown surrounding ego vehicle 105, and direction of travel social safety zones z 312(1), 312(2) and 312(3) (referred to collectively or generically using reference numeral 312), are shown surrounding social objects 308(1) 308(2) and 308(3) (referred to collectively or generically using reference numeral 312), respectively.

In example embodiments, in addition to direction of travel safety zones (which will be referred to as front safety zones for convenience), other safety zones may also be defined for the ego vehicle 105 and each of the social objects 308, including for example a back safety zone (i.e. opposite to the direction of travel) and right and left safety zones (i.e. in horizontal directions that are perpendicular to the direction of travel). In the case of vehicles that are capable of three dimensional movement (for example flight enabled vehicles and submarines), up and down safety zones may also be defined. In some examples, omnidirectional safety zones may be defined for the ego vehicle 105 and each of the social objects 308.

In at least some examples, the safety zones are defined as three dimensional (3D) spaces relative to the respective ego vehicle 105 and social objects 308, and in this regard FIG. 4 illustrates 3D forward ego safety zone z 310 in respect of ego vehicle 105, which as shown has a zone length $z_{length}$, zone width $z_{width}$, and zone $z_{height}$. As will be explained in greater detail below, one or more of the safety zone dimensions (for example zone length $z_{length}$) can be adaptively determined by the predictive safety control system 172 based on one or more properties of a sensed vehicle state, such as speed for example. In some examples, some zone dimensions (for example height and width) may be based exclusively on predetermined vehicle dimensions.

As indicated by arrow 314, which indicates a predicted path of ego vehicle 105 in response to a possible action, FIG. 3 represents a potential left hand turn scenario. Based solely on the ego vehicle forward safety zone z 310, it appears that ego vehicle can safely make a left hand turn. However, when the forward social safety zone z 312(1) of social object 308(1) is considered, it can be determined that the predicted ego vehicle path 314 intersects with the forward social safety zone z 312(1). Accordingly, a decision can be made to brake and not make the left hand turn at the immediate time.

Accordingly, in example embodiments, predictive safety control system 172 is configured to select behavior actions with the objective of keeping the social objects 308 out of the ego safety zone (e.g. z 310) and keeping the ego vehicle 105 out of the social safety zones (e.g. z 312(1), 312(2) and 312(3)) of any of the social objects 308. An example architecture and operation of predictive safety control system 172 will now be provided with reference to FIG. 5, which illustrates a functional block diagram of predictive safety control system 172 accordingly to example embodiments.

Figure 5:
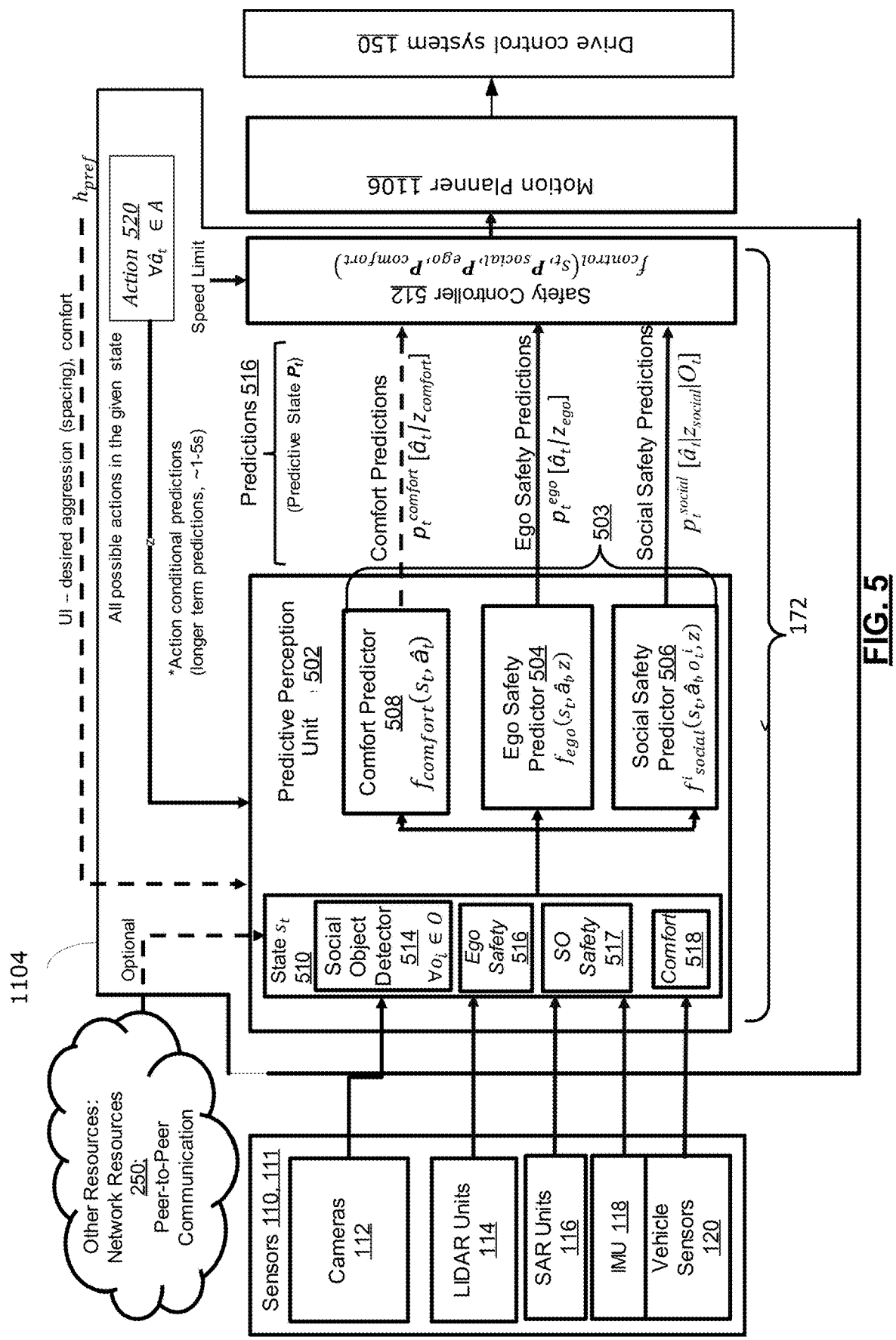
FIG. 5 is a block diagram of predictive safety control system according to an example embodiment.

As shown in FIG. 5, in example embodiments the predictive safety control system 172 includes a predictive perception unit 502, which is configured to make predictions 516 about possible future states based on a current state determined from sensor data received from environmental sensors 110 and vehicle sensors 111 (i.e., information about the environment the ego vehicle 105 operates in sensed by the sensors 110 and information about the ego vehicle 100 sensed by the vehicle sensors 111), and a safety controller 512, which is configured to select behavior actions based on the predicted future states.

In example embodiments, the predictive perception unit 502 includes a state module 510 and a set 503 of predictor modules 404, 406, 408.

State Module

The state module 510 is configured to map sensor data received from environmental sensors 110, vehicle sensors 111 and, in some examples, external resources (e.g. network resources 250 or other social objects) to a current vehicle state $s_t$ of the ego vehicle 105. The ego vehicle state $s_t \in S$ (where S represents all possible state values) is a representation of the ego vehicle environment at a discrete time t, and includes numeric values (e.g. state data) describing aspects of the physical environment surrounding the ego vehicle 105 ($s_{t,env}$) and the physical vehicle operating parameters of the ego vehicle 150 itself ($s_{t,op}$).

In some examples, vehicle parameter state data $s_{t,op}$ included in the ego vehicle state $s_t$ about the physical operating parameters of the ego vehicle 105 may be based on sensor data received from vehicle sensors 111. Vehicle parameter state data $s_{t,op}$ about the current physical operating parameters may include, for example: ego vehicle speed v; engine RPM; transmission gear; throttle position; brake position; steering angle; angular acceleration; linear acceleration; and vehicle pitch, yaw and roll.

In example embodiments, environmental state data $s_{t,env}$ included in ego vehicle state $s_t$ about the physical environment surrounding the ego vehicle 105 may be determined based on sensor data about the surroundings of the ego vehicle 105 as detected by embedded environmental sensors 110 (e.g. one or more of cameras 112, LIDAR units 114 and radar units 116). Environmental state data $s_{t,env}$ may for example include data about obstacles (e.g. stationary objects and social objects), road lanes, traffic lights, road side and overhead signs, road markings, road conditions and other detectable elements within the environment surrounding the ego vehicle 105. In at least some examples, one or more of the environmental sensors 110 may have on-board processing capabilities that enable intelligent outputs such as distance measurements or speed measurements of nearby social objects, however in some examples such calculations may be performed by the state module 510 based on less refined data from sensors 111. By way of example, LIDAR units 114 may provide range images or point cloud data representative of a point cloud that provide 360 degree coverage of the physical environment (including for example social objects 308) surrounding the ego vehicle 105. The surrounding environment data from LIDAR units 114 may in some examples be supplemented with data from one or both of cameras 112 and radar units 116.

In some examples, data about the surrounding environment of the ego vehicle 105 may also be received through wireless transceiver(s) 130 from other resources, including for example data about weather or road conditions from network resources 250, and data received directly or indirectly from other social objects 308. By way of example, third-party vehicles in the environment may be configured to communicate information about one or more of their own perceived state (based, for example, on their own sensor data), planned behavior, or planned actions.

As noted above, the environmental state data $s_{t,env}$ generated by state module 510 about the physical environment surrounding the ego vehicle 105 includes data about stationary objects and moving objects, including social objects 308. In some examples, the data included in environmental state data $s_{t,env}$ may be limited to data that indicates the presence and location of obstacles in the environment of the ego vehicle 105. In example embodiments, the state module 510 is configured to generate additional state data in respect of social objects 308. In this regard, in some example embodiments, the state module 510 includes a social object detector function 514 that is configured to identify social objects 308 within the environment of the ego vehicle 105, and generate a representative social object state $o_t^i$ for each social object 308(i) detected at time t. In example embodiments, the social object state $o_t^i$ generated in respect of a social object 308(i) may include a unique identifier and data indicating one or more of a speed v of the social object 308(i), a relative location and/or absolute location and direction of the social object 308(i), and dimensions of the social object 308(i), among other things. Accordingly, social object detector function 514 is configured to generate a social object state data set $O_t$ that includes $o_t^i$, i=1 ... $N_t^{obj}$ where $N_t^{obj}$ is the number of social objects detected at time t. The number $N_t^{obj}$ of social objects 308 will typically vary, and in example embodiments, the social object detector function 514 is configured to limit the number $N_t^{obj}$ of social objects represented in data set $O_t$ to a threshold number K. For example, where the number of social objects 308 detectable within the environment of the ego vehicle 105 is greater than K at time t, social object detector function 514 may be configured to generate SODIs $o_t^i$ for only the $N_t^{obj}$=K closest social objects 308. In example embodiments, social object detector function 514 may employ known object detection methods or receive object data from other modules that employ known object detection methods. An example of one suitable object detection method is described in: Joseph Redmon, Santosh Divvala, Ross Girshick, Ali Farhadi; You Only Look Once: Unified, Real-Time Object Detection; arXiv: 1506.02640v5 9 May 2016.

Accordingly, in example embodiments the state data for ego vehicle 105 at time t can be represented as $s_t = s_{t,env}, s_{t,op}, O_t$.

In example embodiments, some or all of the functionality of state module 510 may be implemented by modules of systems of the vehicle control system 115 other than predictive perception unit 502. For example, the some or all of the functionality of state module 510 may be implemented in the perception system 171.

In example embodiments, state module 510 is configured to calculate additional state data in addition to the ego vehicle state $s_t$ described above. This calculated state data $s_{t,calc}$ may for example include data indicating current ego vehicle safety, data indicating current social object safety, and optionally data indicating current ego vehicle comfort. In this regard, in example embodiments state module 510 includes an ego safety function 516 for calculating an ego vehicle safety state for the ego vehicle 105, a social object safety function 517 for calculating a social object safety state for each of the social objects 308, and a comfort function 518 for calculating a comfort state for the ego vehicle 105.

In some examples, the current safety states and current comfort states are calculated only when training predictor modules 504, 506, 508. For example, current ego safety states, current social object safety states and current comfort states can be used to generate respective cumulant signals (pseudo-reward signals) for training ego safety, social safety and comfort GVFs respectively that are used in example embodiments to implement the ego safety, social safety and comfort predictor modules 504, 506, and 508 (described in greater detail below).

As noted above in respect of FIGS. 3 and 4, the predictive safety control system 172 is configured to define one or more ego safety zones z around ego vehicle 105 and one or more social safety zones z around any surrounding social objects 308. In example embodiments, the safety zones z for ego-vehicle 105 are defined by ego safety function 516 and the safety zones z for respective social objects 308 are determined by social object safety function 517, and the safety states and are determined on a zone by zone basis.

In one example, ego safety function 516 (safe) is a function that maps parameters concerning current ego vehicle state $s_t \in S$, parameters concerning safety $h_{pref}^{safe} \in H_{safe}$ and the safety zone $z \in Z_{ego}$, represented as follows:

$$\text{safe}: S \times H_{safe} \times Z_{ego} \rightarrow [0,1] \quad (1)$$

The output of the ego safety state function 516 is a value between 0 and 1 that indicates the safety state of the ego vehicle 105 for the specific safety zone z, where 1 is safe and 0 is unsafe. Possible ego safety zones z include: omni-directional (safe or unsafe in all directions); specific spatial zones/areas around the vehicle; specific directions around the vehicle. In the following description, direction of travel (e.g. front) safety zones such as those as discussed above in respect of FIGS. 3 and 4 are used for purposes of illustrating example embodiments.

In one example embodiment, the ego safety state function 516 is configured to conclude that the ego safety state at time t for a zone z is safe if data from environmental sensors 110 indicates that no obstacles are located in the zone z. In a specific example, the safety parameters are selected to specify that ego safety zone z is safe at time t if LIDAR data representative of a point cloud received from Lidar units 114 indicates that less than a threshold number of data points fall within the boundaries of the ego safety zone z. In some examples, the threshold could be 1 point, and in some example the threshold could be set higher to avoid false positives.

Accordingly, in an example embodiment, the ego-vehicle safety function 516 is defined as:

$$\text{safe}(s_t, h_{pref}^{safe}, z) = \begin{cases} 0 & \text{if } \exists o \in z \\ 1 & \text{otherwise} \end{cases} \quad (2)$$

where o is a an object (for example a stationary object or a social object 308) detected in the environment around the ego vehicle 105. The zone $z \in Z_{ego}$ is a three dimensional zone oriented with respect to the ego vehicle 105. In the illustrated example, as shown in FIG. 4, the length of the front ego safety zone is a function of speed such that $z_{length} = z_{safe} + V_{length}$ where $z_{safe} = vt_{spacing} + d_{min}$; where $t_{spacing}$ represents a pre-defined safe time threshold spacing between the ego vehicle 105 and the object o; $d_{min}$ is a predefined minimum safe distance between the ego vehicle 105 and object o when stopped; $V_{length}$ is the length of the vehicle; and v the speed of the ego vehicle 105.

In example embodiments, the predefined safety thresholds $t_{spacing}$ and $d_{min}$ can be based, within limits, on user input preferences $h_{pref}$.

In one example, social object safety function 517 (social-safe) is a function that maps the current state, the parameters of the detected social object, parameters concerning safety (such as human preferences in spacing) $h_{pref}^{safe} \in H_{safe}$ and the social safety zone $z \in Z_{social}$ to a social safety value in accordance with the following:

$$\text{socialsafe}: S \times O \times H_{safe} \times Z_{social} \rightarrow [0,1] \quad (3)$$

The social safety value (i.e., the output of the above) is a value between 0 and 1 that indicates the safety level of the social object 308 in relation to a specific safety zone z for that social object 308 where 1 is safe and 0 is unsafe. In example embodiments, the social object safety function 517 is configured to determine that the social obstacle safety state at time t is safe if sensor data received from environmental sensors 110 indicates that the ego vehicle 105 is not located in the social safety zone z of any of the social objects. In example embodiments, social object safety function 517 may use social object state data generated by social object detector 514 to predict the social safety of that object. In some examples, rather than or in addition to predicting social safety in respect of social object, the social object safety function 517 may output a global social safety value that indicates a global safety value for all social objects in the surrounding environment. For example, a global social safety value could be determined based on one or more combinations of individual social safety values reaching a defined threshold.

In example embodiments, the social object safety function 517 for a social object 308 for social safety zone z, is defined as:

$$\text{socialsafe}(s_t, o_t^i, h_{pref}^{safe}, z) = \begin{cases} 0 & \text{if } e \text{ intersects with } z \\ 1 & \text{otherwise} \end{cases} \quad (4)$$

where z is the social safety zone $z \in Z_{social}$ of social object 308 (i) (each social object has a set of one or more social safety zones, $Z_{social}$), $o_t^i$ is the state for social object 308(i), and e is the three dimensional geometric volume occupied by the ego vehicle 105. The social safety zone z for the social object 308 is defined based on coordinates given in reference to the ego vehicle 105; social safety zone $z_i$ is calculated by defining a bounding box is around the social object 308 and adding a safety distance $z_{safe}$ along the direction of travel to determine a safety region in front of the social object. Similar to ego-vehicle 105 as discussed above, the safety distance $z_{safe}$ can be a function of the social object's speed.

Although only the functions for front safety zones are set out above, as noted above in example embodiments states could also be determined for other possible zones z, including for example: an omni-directional safety zone (safe or unsafe in all directions); and other specific spatial zones/areas around the vehicle, including for example side zones and, in the case of objects enabled for 3D motion, vertical zones.

In example embodiments, zone specific ego vehicle comfort state function 518 for the ego vehicle 105 is represented as:

$$\text{comfort}: S \times H_{comfort} \times Z \rightarrow [0,1] \quad (5)$$

The comfort safety value (i.e., the output of the comfort state function) is a value between 0 and 1 that indicates the comfort level of the ego vehicle 105 (in relation to a specific zone) where 1 is comfortable and 0 is uncomfortable. In one example embodiment, ego vehicle comfort state function 518 is defined as:

$$\text{comfort}(s_t, h_{pref}^{comfort}) = \begin{cases} 1 & \text{if } \|a_t^{accel}\| < \theta_{accel} \\ 0 & \text{otherwise} \end{cases} \quad (6)$$

where $\|a_t^{accel}\|$ is the root mean square (RMS) of the accelerometer data representative of the acceleration or vibration of the ego vehicle 105 received from an accelerometer sensor (for example an accelerometer sensor included in the IMU 118) at time t and $\theta_{accel}$ is comfort threshold for measured acceleration or vibration in the ego vehicle 105.

In some embodiments, the safety, social safety and comfort functions are defined based on algorithms and criteria set by human experts. In some examples, one or both of the safety and comfort thresholds (for example may be based, within defined safety limits, on user input preferences ($h_{pref}^{safe}$, $h_{pref}^{comfort}$), may be automatically adjusted based on road and weather conditions received through network resources 250, or may be based on road surface conditions as sensed by cameras 112.

Predictor Modules

As illustrated in FIG. 5, the set 503 of predictor modules 504, 506, 508 includes ego safety predictor module 504, social safety predictor module 506 and, in at least some examples, a comfort predictor module 508. The state $s_t$ constructed by the state module 510 is used by predictor modules 504, 506, 508 to determine a set of action conditioned (AC) predictions 516 about the effects of various behavior actions on the environment of ego vehicle 105. The AC predictions 516 are behavior action conditioned in that the predictions indicate a predicted state for a future time that is conditional on a certain behavior action $a_t$ occurring. In example embodiments t1 can be from 1 to 5 seconds.

In this regard, in example embodiments, predictive perception unit 502 receives, as an input from an action module 520 (which may be part of the behavior planner 1104), a set A of all possible behavior actions $â_t$ that can be taken by the ego vehicle 105 given the current vehicle state $s_t$. In some examples, the set A may include all behavior actions possible at defined intervals within a future time duration, for example all behavior actions possible at each second for the next 5 seconds. In example embodiments, the behavior actions $â_t$ in the set A will each specify a target speed $v_t$ for speed controller 154. For example a target speed $v_t$ could be specified on the interval of [0, $V_{max}$] where 0 is stopped and $v_{max}$ is the maximum allowed target speed permitted by speed controller 154. A target direction (e.g. a steering angle) may also be included in the behavior actions $a_t$ (e.g. −1=−50 degrees to +1=+50 degrees, where 0 degrees is no angle). In example embodiments, the set A of all possible behavior actions is generated by action module 520 using known techniques. In some example embodiments, action module 520 is configured to select the set A of permissible behavior actions based on the planned route output by the mission planner 1102 and current state of the ego vehicle 105. In some examples, all permissible behavior actions could include all physically plausible behaviors, and in some examples, the set of permissible behavior actions could be intelligently filtered to takes into account the local laws and eliminate illegal behaviors.

As will be described in greater detail below, the AC predictions 516 that are output by the set 503 of predictor modules 504, 506, 508 are provided to the safety controller 512, which selects a suitable behavior action to achieve one or more target objectives based on the AC predictions 516. Target objectives include one or more of a target speed $v_t$, a target direction, a target safety, a target comfort, a target lane. Accordingly, predictive perception unit 502 provides a set of AC predictions 516 that effectively form an interactive model of the environment surrounding the ego vehicle 105, providing the safety controller 512 with the input needed for the safety controller 512 to select a behavior action to minimize a defined cost function or maximize total reward.

Figure 6:
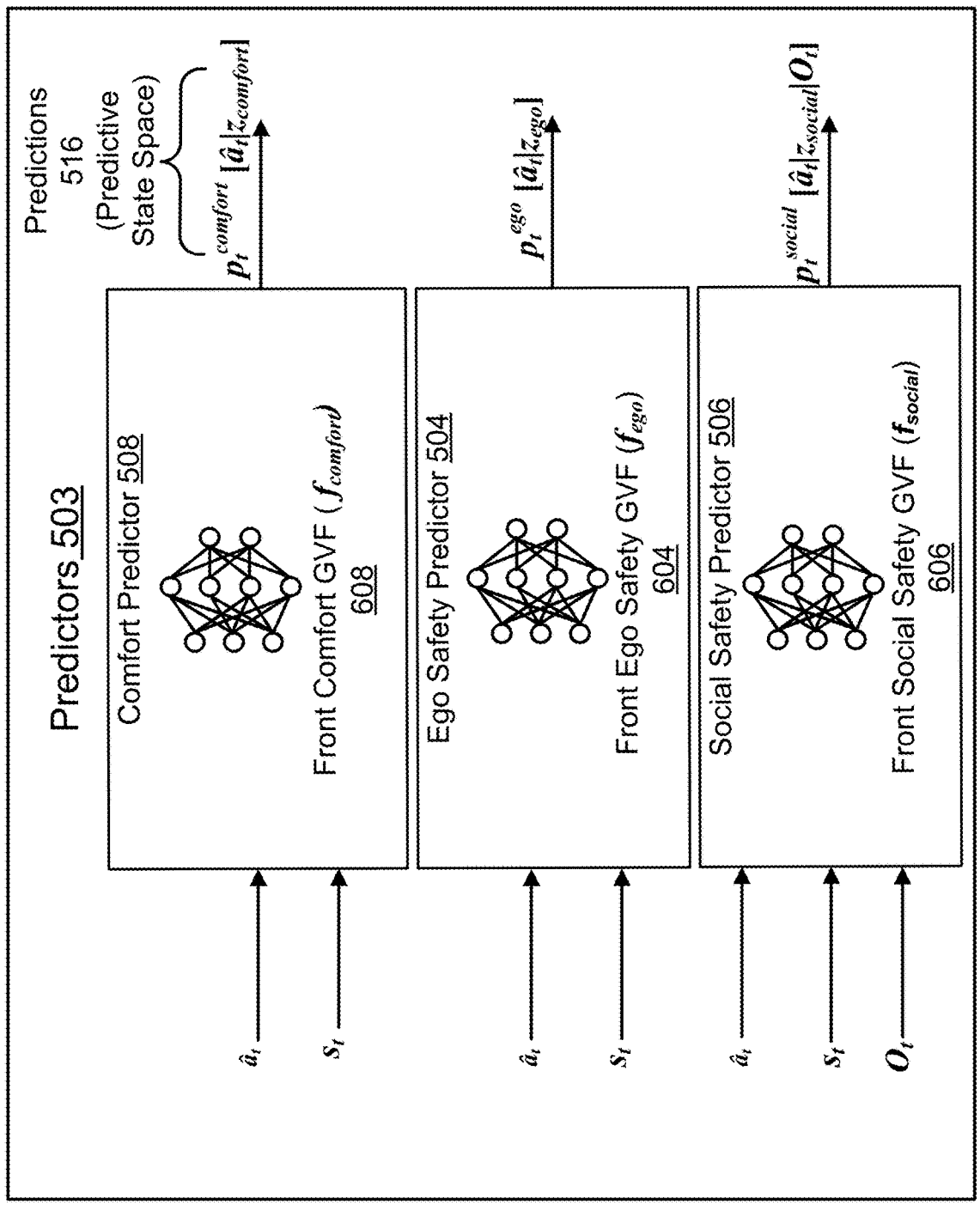
FIG. 6 is a block diagram of predictor modules of the predictive safety control system of FIG. 5, according to example embodiments.

Referring to FIG. 6, in some embodiments the predictor modules 504, 506, 508 each include one or more respective predictor functions 604, 606, 608 that are implemented by learned agents based on machine learning algorithms trained through reinforcement learning (RL) (see for example the above identified papers by R. Sutton et. Al. and D. Silver et. al.). For example, the predictor functions 604, 606 and 608 may be implemented as one or more learned agents in the form of trained neural networks that are implemented using one or more CPUs or GPUs of the processor system 102 of vehicle control system 115. In some examples, a separate neural network is used for each predictor function 604, 606, 608, although in some embodiments at least some layers of a neural network may be used for multiple predictors—for example in some embodiments it is possible that one or more or all predictors may share the same inputs (state) along with 1 or more layers, meaning that it is possible for all predictors to be implemented in a single neural network with multiple diverging output branches for each prediction.

Neural network (NN) based predictor functions 604, 606, 608 can be trained using different methods, however in an example embodiment RL is used to determine GVFs for each of the NN based predictor functions 604, 606 608 (also referred to herein as predictor GVFs). An example embodiment for training predictor functions 604, 606, 608 will be described in greater detail below. In some alternative embodiments, one or more of the predictor functions 604, 606, 608 are implemented by rule-based algorithms.

In at least some example embodiments, the predictive perception unit 502 includes a total of $|Z_{ego}|+|Z_{social}|+|Z_{comfort}|$ predictor functions, where $|Z_{ego}|$ is the number of ego vehicle safety zones, $|Z_{social}|$ is the number of social object safety zones, and $|Z_{comfort}|$ is the number of ego vehicle comfort zones. For example, in the case where only front ego safety, front social object safety, and front ego vehicle comfort zones are considered, the number of predictor functions is three as shown in FIG. 6, namely: front zone ego safety predictor GVF 604 ($f_{ego}$); front zone social object safety predictor GVF 606 ($f_{social}$); and front zone ego vehicle comfort predictor GVF 608 ($f_{comfort}$). In some embodiments, the comfort predictor module 508 and its corresponding predictor GVF 608 can be omitted.

The predictor functions 604, 606, 608 collectively make predictions 516 about the environment, providing a predictive state space $p_t \in P$ for the safety controller 512. The predictions 516 are action conditional "what-ifs" that evaluate the long term impact (e.g. for the next 1-5 seconds) of possible actions on ego safety, social safety, and comfort. The mapping from the state space S=$s_t$, $O_t$ to the predictive state space P that is performed by the set 503 of predictor modules 504, 506, 508 can be represented as:

$$p:S \rightarrow P \quad (7)$$

Each predictor functions 604, 606, 608 generates a vector of predictions, one for each possible behavior action $â_t^{(0)}$, $â_t^{(1)}$, $â_t^{(2)}$, ... $â_t^{(n)}$ in state $s_t$, where n=|A| the number of behavior actions available The number of predictions collectively output by predictor modules 504, 506 and 508 and their respective predictor functions 504, 506, 508 is $|Z_{ego}|+N_t^{obj}|Z_{social}|+|Z_{comfort}|$, for each behavior action available.

Each of the predictor modules 504, 506 and 508 and their respective predictor functions 504, 506, 508 will now be described in greater detail. In example embodiments, the ego safety predictor module 504 is configured to ego predict, based on the current vehicle state $s_t$, future ego safety predictions $p_t^{ego}[\hat{a}_t/z_{ego}]$ for each of a plurality of different possible behavior actions $\hat{a}_t$. As noted above, the ego safety predictor module 504 includes a predictor GVF $f_{ego}(s_t,\hat{a}_t,z)$ for each ego safety zone. In the illustrated example of FIG. 6, only front zone ego safety predictor GVF $f_{ego}(s_t,\hat{a}_t,z)$ 604 is illustrated. In an example embodiment, the specific data from the ego vehicle state space $(s_t)$ that is input to the front ego safety zone predictor GVF $f_{ego}(s_t,\hat{a}_t,z)$ 604 may include, for a given time t: (1) physical ego vehicle operating state $s_{t,op}$, including data for: ego vehicle speed $v_t$, transmission gear, engine RPM, steering angle, throttle position, and brake position; and (2) ego vehicle environment state $s_{t,env}$, which may for example include LIDAR data representative of a point cloud and/or other environmental data such as image data or radar data. For each possible input behavior action $\hat{a}_t$, the input may include an ego target speed $V_{target}$ and a target steering angle (or direction). In some examples, the output safety prediction $p_t^{ego}[\hat{a}_t/z_{ego}]$ for a safety zone is an ego safety value that indicates a probability that, based on a specific behavior action $\hat{a}_t$, the ego safety zone z will be free of both static and moving obstacles (such as another vehicle) at future time t+1. In some examples, predicted ego safety $p_t^{ego}[\hat{a}_t/z_{ego}]$ is represented as a probability value normalized between 0 and 1, where 0 is unsafe (e.g. 100% certain an obstacle will be in the ego safety zone) and 1 is safe (e.g. 100% certain no obstacle will be in the ego safety zone).

In this regard, the front zone ego safety predictor GVF $f_{ego}(s_t,\hat{a}_t,z)$ 604 maps current state, safety preferences $h_{pref}^{safe} \in H_{safe}$, safety zone $z \in Z_{ego}$, and next behavior action $\hat{a}_t \in A$ to a value between 0 and 1 as shown:

$$f_{ego}: S \times A \times H_{safe} \times Z \rightarrow [0,1] \qquad (8)$$

The output of the front ego safety zone predictor GVF $f_{ego}(s_t,\hat{a}_t,z)$ 604 for each behavior action is a scaler representation of the safety probability of the front ego safety zone.

In some examples, the current ego vehicle safety state safe may optionally also be included as an input to the ego vehicle safety predictor GVF 604. In example embodiments, the current ego vehicle safety state safe is included as an input to the ego vehicle safety predictor GVF $f_{ego}$ 604 when training the predictor GVF $f_{ego}$ 604 to learn predictions, as described in greater detail below.

The social object safety predictor module 506 is configured to predict, based on the current ego vehicle state $s_t$ and the social object state space $O_t$, future social object safety predictions $p_t^{social}[\hat{a}_t|z_{social}|o_t^i]$ for each of $N_t^{obj}$ social objects, for a plurality of different possible behavior actions $\hat{a}_t$. As noted above, the social object safety predictor module 506 includes a predictor GVF $f_{social}(s_t,\hat{a}_t,o_t^i,z)$ 606 for each ego vehicle safety zone. In the illustrated example of FIG. 6, only front zone social object safety predictor GVF $f_{social}(s_t,\hat{a}_t,o_t^i,z)$ 606 is illustrated. In an example embodiment, the specific data from the ego vehicle state space $(s_t)$ that is input to the front social object safety zone predictor $f_{social}(s_t,\hat{a}_t,o_t^i,z)$ 606 may include, for a given time t: (1) physical ego vehicle operating state $s_{t,op}$, including data for: ego vehicle speed $v_t$, transmission gear, engine RPM, steering angle, throttle position, ego vehicle dimensions, and brake position; (2) ego vehicle environment state $S_{t,env}$, which may for example include LIDAR data representative of a point cloud and/or other environmental data such as image data or radar data; and (3) social object state $o_t^i$ for each of the $N_t^{obj}$ social objects, including, for each social object: relative position to the ego vehicle, speed, heading or direction and turning rate. For each possible input behavior action $\hat{a}_t$, the input may include an ego vehicle target speed $V_{target}$ and an ego vehicle target steering angle (or direction). In some examples, the output social safety prediction $p_t^{social}[\hat{a}_t|Z_{social}|o_t^i]$ for the safety zone of each social object is a social safety value that indicates a probability that, based on a specific behavior action $\hat{a}_t$, the social object safety zone z will be free of the ego vehicle 105 at future time t+1. In some examples, predicted social zone safety $p_t^{social}[\hat{a}_t|o_t^i]$ is represented as a probability value normalized between 0 and 1, where 0 is unsafe (e.g. 100% certain ego vehicle will be in the social object safety zone) and 1 is safe (e.g. 100% certain ego vehicle will NOT be in the social object safety zone).

In this regard, the front zone social vehicle safety predictor GVF $f_{social}(s_t,\hat{a}_t,o_t^i,z)$ 606 maps current state, safety preferences $h_{pref}^{safe} \in H_{safe}$, social safety zone $z \in Z_{social}$, and next behavior action $\hat{a}_t \in A$ to a value between 0 and 1 as shown:

$$f_{social}: S \times O \times A \times H_{safe} \times Z_{social} \rightarrow [0,1] \qquad (9)$$

The output of the front ego safety zone predictor GVF $f_{social}(s_t,\hat{a}_t,o_t^i,z)$ 604 for each social object for each behavior action is a scaler representation of the safety probability of the front social object safety zone.

In some examples, the current social object safety state socialsafe may optionally also be included as an input to the social object safety predictor GVF 606. In example embodiments, the social object safety states socialsafe are included as an input to the social object safety predictor GVF 606 when training the predictor GVF to learn predictions, as described in greater detail below.

In embodiments that include comfort predictor module 508, the comfort predictor module 508 can be configured in the same manner as ego safety predictor module 504, except that comfort predictor module 508 makes predictions in respect of ego vehicle comfort risk zones rather than safety zones. In this regard, comfort predictor module 508 is configured to predict, based on the current vehicle state $s_t$, future vehicle comfort predictions $p_t^{comfort}[\hat{a}_t|z_{comfort}]$ for each of a plurality of different behavior actions $\hat{a}_t$. As noted above, the ego vehicle comfort predictor module 508 includes a predictor GVF $f_{comfort}(s_t,\hat{a}_t)$ for each ego vehicle comfort zone. In the illustrated example of FIG. 6, only front zone ego vehicle safety predictor GVF $f_{comfort}(s_t,\hat{a}_t)$ 608 is illustrated. In an example embodiment, the specific data from the ego vehicle state space $(s_t)$ that is input to the front ego vehicle safety zone predictor GVF $f_{comfort}(s_t,\hat{a}_t)$ 608 may include, for a given time t: physical ego vehicle operating state $s_{t,op}$, including data for: ego vehicle speed $v_t$, transmission gear, engine RPM, steering angle, throttle position, brake position, as well as a short history of linear and/or sensor data indicative of acceleration of the ego vehicle 105 received from the vehicle sensors 111, such as the IMU 118 (e.g. last "K" RMS readings). For each possible input behavior action $\hat{a}_t$, the input may include an ego target speed $V_{target}$ and a target steering angle. In some examples, the vehicle comfort prediction $p_t^{comfort}[\hat{a}_t|z_{comfort}]$ indicates a probability that, based on a specific behavior action $\hat{a}_t$, the RMS acceleration of the ego vehicle 105 will fall within a comfort threshold at future time t+1. In some examples, predicted comfort is represented as a probability value normalized between 0 and 1, where 0 is uncomfortable (e.g. 100% certain ego vehicle will be outside comfort threshold) and 1 is comfortable (e.g. 100% certain ego vehicle comfort will be within threshold).

In some example embodiments, comfort predictor module 508 may optionally also receive the current comfort state comfort($s_t$,z) as an input.

Accordingly, the AC predictions 516 that are output by the prediction perception unit 502 for each available behavior action $\hat{a}_t$ at time t can be represented as:

$$p_t(\hat{a}_t, z_{ego}, z_{social}, z_{comfort}) = [p_t^{comfort}(\hat{a}_t, z_{comfort}), \\ p_t^{ego}(\hat{a}_t, z_{ego}), p_t^{social}(\hat{a}_t, o_t^1, z_{social}), \ldots p_t^{social} \\ (\hat{a}_t, o_t^{N_{obj}}, z_{social})] \quad (10)$$

These AC predictions 516 collectively provide a predictive state space $p_t \in P$ for the safety controller 512. All of these predictions are action conditional "what-ifs" that can be used to evaluate the impact that different behavior actions will have on ego vehicle safety, social object safety and ego vehicle comfort.

Safety Controller

The predictions $p_t$ are supplied to the safety controller 512 which is configured to select a next behavior action for the ego vehicle 105 to maximize safety, comfort and other goals. The safety controller 512 can be represented as a function $f_{control}$ that maps current state and current predictive state to the next behavior action as follows:

$$f_{control}: S \times P \rightarrow A \quad (11)$$

Figure 7:
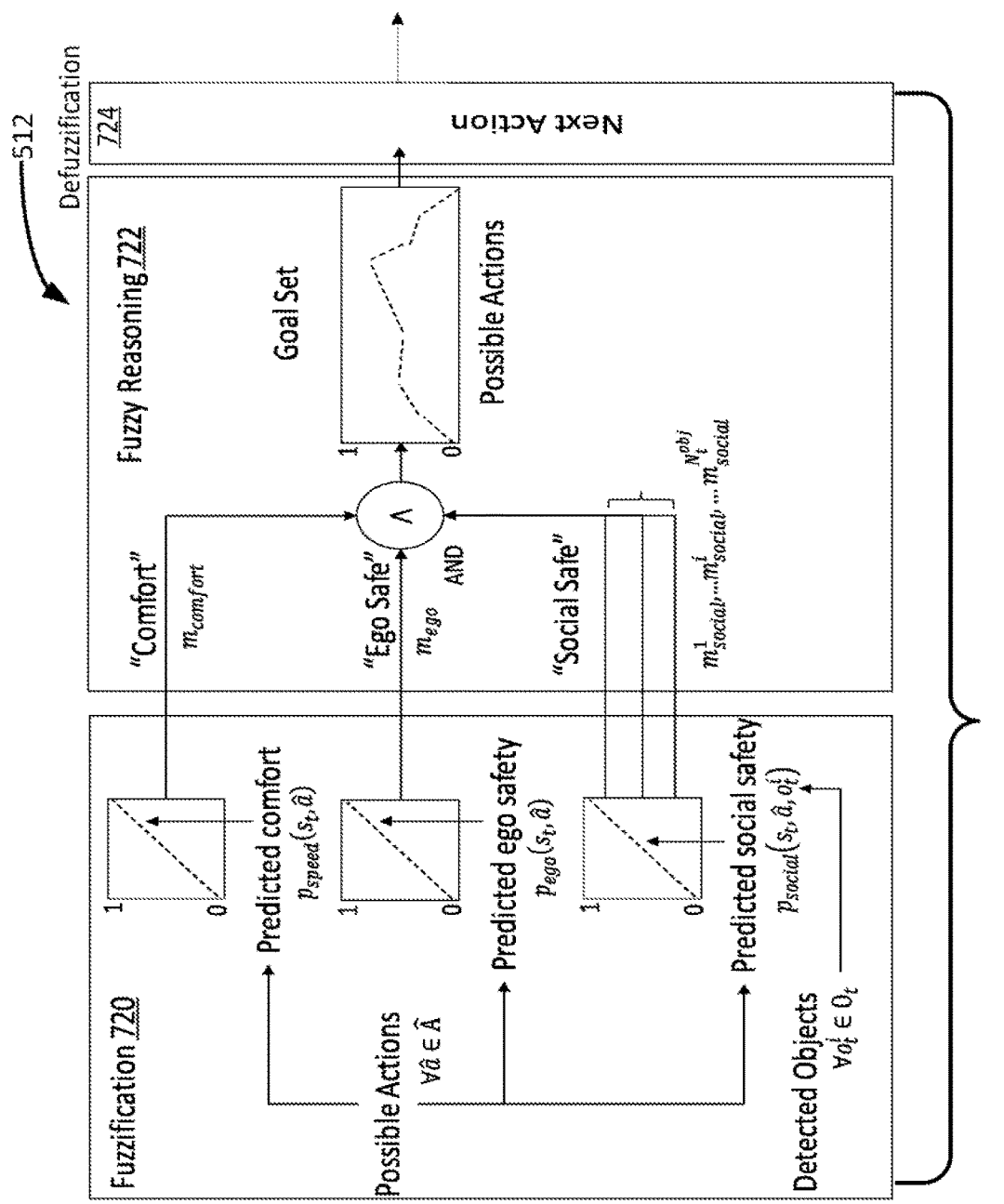
FIG. 7 is a block diagram of a safety controller of the predictive safety control system of FIG. 5.

In example embodiments, the safety controller 512 can implement a number of different controllers. In the presently disclosed example embodiment, as indicated in FIG. 7, the safety controller 512 includes a fuzzy inference system (FIS) controller 702 to select a target speed $V_{target}$ and a classical PID controller 714 (which may for example be part of speed controller 154) to achieve the target speed $V_{target}$. In example embodiments, FIS controller 702 is configured to seek for the behavior action that satisfies the following linguistic statement:

Behavior action to be taken will keep ego vehicle
    Safe

AND behavior action to be taken with keep all
    social objects

Safe

AND behavior action to be taken will keep ego
    vehicle

Comfortable     (12)

In example embodiments, FIS controller 702 is configured to treat the selection of a behavior action as a maximization problem, however a maximization is just one defuzzification approach that can be used. As shown in FIG. 7, in one example, FIS controller 702 implements the following modules or operations: (a) fuzzification module 720; (b) fuzzy reasoning module 722; and (c) defuzzification module 724.

Fuzzification module 720 includes: (i) fuzzification function $SAFE_{ego}$ for mapping ego safety predictions $p_{ego}$ to fuzzy truth values $m_{ego}$; (ii) fuzzification function $SAFE_{social}$ for mapping social safety predictions $p_{social}$ for each social object to fuzzy truth values $m_{social}$; and (iii) fuzzification function $COMFORT_{ego}$ for mapping ego comfort predictions $p_{comfort}$ to fuzzy truth values $m_{comfort}$. Accordingly, in an example embodiment, fuzzification functions $SAFE_{ego}$, $SAFE_{social}$, $COMFORT_{ego}$ map predictions $p_t$ to graded truth values, or values between 0 and 1 that denote the degree to which the safety prediction of a behavior action is considered safe to an end-user, as follows:

Front safety $SAFE_{ego}$:[0,1]→[0,1]
Back safety $SAFE_{social}$:[0,1]→[0,1]
Front comfort $COMFORT_{ego}$:[0,1]→[0,1]

The mapping performed by fuzzification module 720 can be represented as:

$$m_{ego}[\hat{a}_t|z_{ego}] = SAFE_{ego}(p_{ego}[\hat{a}_t|z_{ego}]) \quad (13)$$

$$m_{social}[\hat{a}_t|z_{social}, o_t] = SAFE_{social}(p_{social}[\hat{a}_t|z_{social}, o_t]) \quad (14)$$

$$m_{comfort}[\hat{a}_t] = COMFORT_{ego}(p_{comfort}[\hat{a}_t]) \quad (15)$$

where the truth values of ego, social and comfort are respectively denoted as $m_{ego}[\hat{a}_t]$, $m_{social}[\hat{a}_t]$ and $m_{comfort}[\hat{a}_t]$.

Fuzzy reasoning module 722 is configured to apply fuzzy inference in respect of the truth values $m_{ego}[\hat{a}_t]$, $m_{social}[\hat{a}_t]$ and $m_{comfort}[\hat{a}_t]$ to generate a goal fuzzy set that satisfies the following statement (16) (which is a restatement of linguistic statement (12)):

$$G[\hat{a}_t] = m_{comfort}[\hat{a}_t] \wedge \left( \bigwedge_{\forall z_{ego} \in Z_{ego}} m_{ego}[\hat{a}_t | z_{ego}] \right) \wedge \\ \left( \bigwedge_{\forall z_{social} \in Z_{social}, \forall o_t \in O} m_{social}[\hat{a}_t | z_{social}, o_t] \right) \quad (16)$$

where $\wedge$ is a standard t-norm operator (common t-norms are min or product) and $G[\hat{a}_t]$ is the goal fuzzy set.

The goal fuzzy set $G[\hat{a}_t]$ characterizes the statement (12) and denotes the membership value of each behavior action that satisfies the statement. Defuzzification module 724 is configured to produce a final behavior action by applying defuzzification to the goal fuzzy set $G[\hat{a}_t]$ to select a single best behavior action. Although different defuzzification methods exist in example embodiments defuzzification module 724 is configured to select the behavior action with maximum membership. The defuzzification module returns the behavior action that maximizes the membership values as computed by $$a_t = \arg\max_{\forall \hat{a}_t \in A} G[\hat{a}_t] \quad (17)$$

In some example embodiments, $COMFORT_{ego}$ can be omitted, however its inclusion may enable a selected behavior action sequence over time that results in a smoother ride for the ego vehicle 105.

In example embodiments, target speed $v_{target}$ can be a maximum desired speed that is as set by driving assistance system 166 or autonomous driving system 170, for example. The fuzzification functions $Safe_{ego}$, $Safe_{social}$, $Comfort_{ego}$ and fuzzy reasoning module 722 can be implemented using rules-based algorithms, and in some embodiments may be implemented as trainable functions learned via machine learning. In a rules-based implementation, fuzzification functions $Safe_{ego}$, $Safe_{social}$, $Comfort_{ego}$ and fuzzy reasoning module 722 may be configured using manual specifications to optimize goal fuzzy sets. In some embodiments, the definitions used and rules applied by the fuzzification functions $Safe_{ego}$, $Safe_{social}$, $Comfort_{ego}$ and fuzzy reasoning module 722 to output goal fuzzy sets are selected to support the entire behavior action space so as to mitigate against scenarios where there may be no suitable behavior action found. In the case where behavior action space at an unprotected left turn is turn left or yield, the behavior command is issued to the motion planner 1106 to formulate a motion plan to be executed by the drive control system 150.

In example embodiments, in order to ensure ego safety is more important than social safety, a requirement may be set that $SAFE_{ego} \subseteq SAFE_{social}$, which means the truth values for ego safety must be higher than the truth values for social safety across the entire domain. An alternative simple interpretation for $SAFE_{ego}$ and $SAFE_{social}$ can be the identity function since the probabilistic predictions of safety can be also considered truth values. However, in example embodiments, fuzzy sets may add flexibility to control the interpretation of the predictions from a system programmer point of view.

Learning the Predictors

As noted above, in example embodiments, ego vehicle safety predictor GVF 604 ($f_{ego}$), social object safety predictor GVF 606 ($f_{social}$), ego vehicle comfort predictor GVF 608 ($f_{comfort}$) are trained using RL based on methodology disclosed in the above identified mentioned paper by R. Sutton et al. To construct each GVF, a cumulant (pseudo-reward) function, pseudo-termination function, and target policy is defined. For constant values of the termination function, namely the discount factor γ, the time horizon for the prediction can be controlled via the relationship:

$$n_{\Delta t} = \frac{1}{1-\gamma} \quad (18)$$

where $n_{\Delta t}$ is the number of time steps to predict into the future.

The cumulant for predicting comfort is:

$$c_t^{comfort} = \text{comfort}(s_t)(1-\gamma) \quad (19)$$

The correction factor 1−γ normalizes the sum of all future cumulants such that the total return $f_{comfort}(s_t,a_t)$ is:

$$f_{comfort}(s_t, a_t) = \sum_{t=0}^{\infty} c_t \gamma^t = (1-\gamma) \sum_{t=0}^{\infty} v_t \gamma^t = \frac{\sum_{t=0}^{\infty} v_t \gamma^t}{\sum_{t=0}^{\infty} \gamma^t} \quad (20)$$

The cumulant for predicting ego safety and social safety, respectively, are:

$$c_t^{ego} = \text{safe}(s_t, h_{pref}^{safe}, z_{ego})(1-\gamma) \quad (21)$$

$$c_t^{social} = \text{socialsafe}(s_t, o, h_{pref}^{safe}, z_{social})(1-\gamma) \quad (22)$$

A target policy of $\pi(a_t|s_t)=1$ for all behavior actions $a_t$ and states $s_t$ can be used for a scenario where selecting an appropriate target policy may be more challenging than building a simple versatile policy for data collection purposes. Defining an expert policy for data collection and training can result in more stable learning than using traditional off-policy learning with a specified target policy. In at least some example embodiments, data collection and learning can be done with a human expert driver.

Although a number of different data collection and training (DCT) systems are possible, in one example, training of the ego safety predictor GVF is treated as a function learning problem. The function to be learned for predicting the front zone ego safety is:

$$\tilde{g}_{t+\Delta t}^{(front)} = f_{safe}^{(front)}(s_t, a_t) \quad (23)$$

where $\tilde{g}_{t+\Delta t}^{(front)}$ is the predicted safety at Δt time steps into the future as described in equation, $s_t$ is a vector that represents the state of the system and $a_t$ is a potential behavior action to be taken.

The function is realized as a standard feed forward neural network. The cumulant for predicting front ego safety is:

$$c_t^{(front)} = \text{safe}(s_t, h_{pref}^{safe}, \text{FRONT})(1-\gamma) \quad (24)$$

where safe $(s_t, h_{pref}^{safe}, z)$ is the current front safety of the ego vehicle, z=FRONT is the direction and γ is the discount factor.

The correction factor 1−γ normalizes the sum of all future cumulants such that the front ego safety predictor GVF $f_{ego}^{(front)}(s_t,a_t)$ 602(1) represents a weighted average of all future front safeties.

In the present example embodiment, state-action-reward-state-action (SARSA) learning is selected for training the ego and social safety predictor functions for improved learning stability. In example embodiments, an expert policy can be used to collect data rather than using traditional off-policy RL learning. In example embodiments, data collection involves creating turn scenarios such as shown in FIG. 3, parking lot scenarios such as shown in FIG. 8, and roadway scenarios such as shown in FIG. 9. In each of the example scenarios, ego vehicle and social objects can be controlled by respective controllers that control direction and speed of the ego vehicles and social objects with pre-defined rules and limits.

In some, examples two types of DCT controllers may be used, namely a "basic controller" that ignores all other objects and only aims to achieve a target speed and a "baseline controller" that aims to achieve a target speed and target inter-vehicle spacing. Data collection for safety predictor training may, in example embodiments be gathered through actual road data, through simulation, or through a combination thereof. Training data coverage of the entire state and behavior action space is desirable for generalization and, in an example embodiment, is achieved through a slow random walk of each of the controller parameters to simulate sample behaviors under different policies such as very cautious following and tail-gating. In the present example, these parameters are target speed and target headway (e.g. inter-vehicle spacing). It is desirable that the policy remain relatively constant over small periods of time in order to enable the safety predictor to learn to generalize.

Using safety predictor DCT systems, training data is collected and used to train respective predictor GVFs that are enabled to predict a probabilistic future safety of the ego vehicle 105 and social objects where the behavior action is assumed to be relatively constant over short periods of time.

As noted above, other simulation systems or even a human expert can be used to collect the necessary data to train the predictor GVFs, so long as sufficient coverage of the state and behavior action spaces is provided to train a GVF that generalizes well. In example embodiments, during training the DCT system observes diverse enough behaviors and situations to enable the resulting safety and comfort predictor functions to be able to make meaningful predictions. In example embodiments, the behavior of the ego vehicle and social objects are sufficiently uncorrelated to avoid the introduction of biases that may result in poor or even incorrect predictions.

In example embodiments, training occurs offline for greater stability and safety in learning; however, it should be noted that the trained GVFs that implement the predictor functions (once trained) can continuously collect and improve predictions in real-time using off-policy RL learning.

As a result of the above training, a target policy with respect to an input action is inherently embedded into each of the ego vehicle safety predictor GVF 604 ($f_{ego}$), social object safety predictor GVF 606 ($f_{social}$), ego vehicle comfort predictor GVF 608 ($f_{comfort}$). Accordingly, during normal operation, the respective predictions that are output by these GVFs are based on the input state as well as the target policy embedded into the predictor functions. Thus: an ego safety prediction for a behavior action indicates a probability that the ego vehicle 105 will be safe based both on the current state and on the ego vehicle 105 following the target policy and the current state; social safety predictions for an behavior action indicate a probability that the social objects will be safe based both on the current state and on the ego vehicle 105 following the target policy; and ego comfort predictions for a behavior action indicate a probability that the ego vehicle 105 will be comfortable based both on the current state and on the ego vehicle 105 following the target policy. In example embodiments, in this context, target policy can be following a set of behavior actions similar to the input behavior action for a future time duration.

Summary of Predictive Safety Control System

Figure 10:
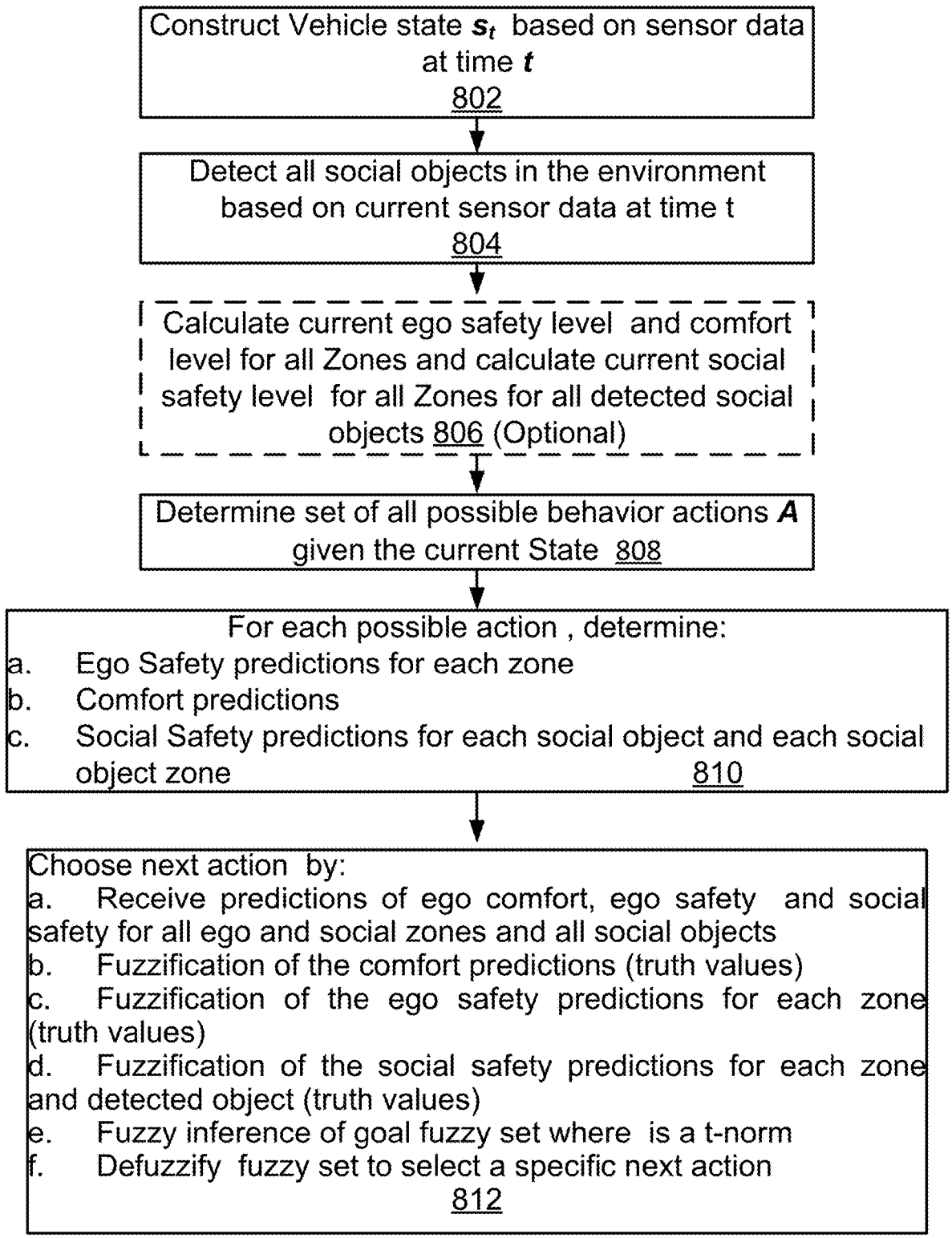
FIG. 10 is a block diagram representing actions taken by the predictive safety control system of FIG. 5, according to example embodiments.

In example embodiments, operation of predictive safety control system 172 as described above is summarized as shown in FIG. 10, as follows:

(1) Receive sensor data (e.g. from sensors 110, 111) at time t and map to state representation $s_t$ (Action 802);

(2) Detect, based on current sensor data at time t, all social objects in the environment and determine social object states $o_t^i \in O$ $\forall i=1 \ldots N_t^{obj}$ at time t, the social object state including one or a combination of social object position, direction, velocity (Action 804);

(3) Optionally (for example during training), calculate current ego safety level safe($s_t$,z) and comfort level comfort($s_t$) for all zones $z \in Z_{ego}$ and calculate current social safety level social($s_t$,$o_t$,z) for all zones $z \in Z_{social}$ for all detected social objects $o_t \in O$(Action 806);

(4) Determine set of all possible behavior actions A given the current state $s_t$ (Action 808);

(5) For each possible behavior action (what-ifs) $\forall \hat{a}_t \in A$: a. calculate comfort predictions $p_{comfort}[\hat{a}_t] = f_{comfort}(s_t,\hat{a}_t)$; b. For each ego zone $\cdot z \in Z_{ego}$, calculate Ego safety predictions $p_{ego}[\hat{a}_t|z] = f_{ego}(s_t,\hat{a}_t,z)$; c. For each social zone $z \in Z_{social}$ and detected object $o_t \in O$, calculate social safety predictions $p_{social}[\hat{a}_t|z,o_t] = f_{social}(s_t,\hat{a}_t,z,o_t)$(Action 810); and (6) Choose next behavior action $f_{control}(s_t,p_{ego}[\hat{a}_t|z_{ego}], p_{comfort}[\hat{a}_t], p_{social}[\hat{a}_t|z_{social},o_t]) = a_t$ as follows: a. Receive predictions of ego comfort $p_{comfort}[\hat{a}_t]$, ego safety $p_{ego}[\hat{a}_t|z_{ego}]$ and $p_{social}[\hat{a}_t|z_{social},o_t]$ for all ego and social zones and all social objects $o_t \in O$; b. Fuzzification of the comfort predictions (truth values) $C_{ego}[\hat{a}_t] = COMFORT_{ego}(p_{comfort}[\hat{a}_t])$; c. Fuzzification of the ego safety predictions for each direction (truth values) $m_{ego}[\hat{a}_t|z_{ego}] = SAFE_{ego}[\hat{a}_t|z_{ego}])$; d. Fuzzification of the social safety predictions for each direction and detected object (truth values) $m_{social}[\hat{a}_t|z_{social},o_t] = SAFE_{social}(p_{social}[\hat{a}_t|z_{social},o_t])$; e. Fuzzy inference of goal fuzzy set where $\Lambda$ is a t-norm $G[\hat{a}_t] = m_{comfort}[\hat{a}_t]\Lambda(\Lambda_{\forall z_{ego} \in Z_{ego}} m_{ego}[\hat{a}_t|z_{ego}]) \Lambda (\Lambda_{\forall z_{social} \in Z_{social}, \forall o_t \in O} m_{social}(\hat{a}_t|z_{social},o_t))$, and f. Defuzzify $G(\hat{a}_t)$ fuzzy set to select a specific next behavior action $a_t$ (Action 812).

As will be appreciated from the above, predictive safety control system 172 considers not only the safety of ego vehicle 105, but also the safety of other social objects 308. Social safety predictors work in tandem with ego safety predictors to address safety in a manner that can be applied across a broad spectrum of environments including intersection handling, multi-lane highway driving, parking lots, school zones, and other complicated environments where the need for social safety is highly important. In example embodiments, predictive safety control system 172 focuses on determining whether actions of the ego vehicle 105 will make another moving object unsafe/safe rather than considering the global safety of another vehicle. Social safety and ego safety are considered as separate components, thereby making it possible to prioritize these safeties differently (e.g. to minimize the potential loss of life) and may enables a more general view of safety that better reflects how human's actually drive.

The scenario of FIG. 3 relates to controlling ego vehicle 105 to make an unprotected left turn at an intersection. A common solution involves classical behavior planning and motion planning methods including time to collision methods, however modeling the environment of an intersection with many actors (vehicles, pedestrians, etc) can be rather challenging. Some modern approaches include using reinforcement learning to issue commands to the motion planner like "turn left" or "yield". This very simple approach does not easily take into account the safety of social vehicles because the rewards for reinforcement learning methods are often ego centric as the agent does not easily observe the actions of the other agents. The most common approach to prevent the learned agent from cutting in front of other vehicles dangerously is to minimize braking of the social agents but this requires often inaccurate modelling of their behavior to determine how much they are braking. Multi-agent RL approaches can be used to consider the other agents however it is rather difficult to determine or understand the policy of the other agents including whether the other driver is actually paying attention (and thus is able to follow a safe policy and slow down if required). In contrast to common solutions, predictive safety control system 172 utilizes a definition of safety (definitions other than that described above can be applied in alternative embodiments) to predict the safety of the other vehicles (or more generally objects) and use both the ego safety and social safety to control the ego vehicle 105 in the intersection.

By predicting social safety, in some examples predictive safety control system 172 may be able to predict the need to wait before executing an unprotected left turn in an intersection in order to keep other social objects 308 safe from ego vehicle 105 while still arriving at the destination lane in a timely manner.

As noted above, in example embodiments, ego and social safety predictor functions are learned via reinforcement learning (RL) using the general value function (GVF) framework. Reinforcement learning may enable a way of dealing with the stochastic and unknown behavior of the other drivers by learning from experience or seeing drivers follow a variety of behaviors and the impact that has on determining whether they are safe from us.

In the example scenarios shown in FIGS. 3, 8 and 9, the objective of is to keep ego vehicle 105 out of the social safety zones 312 of social objects 308 and keep social objects 308 out of ego safety zone 310. In some cases, unsafe situations may arise for the ego vehicle 105 that can be difficult if not impossible to completely avoid; under those conditions, priorities can be set with preference for either ego safety or social safety. In the case of the highway lane scenario of FIG. 9, prioritizing front safety of the ego vehicle 105 is logical since most rear-end collisions from the vehicle behind will not be the fault of the ego driver.

In example embodiments, the systems and methods disclosed herein may in some circumstances reduce the safety risk of behavior actions taken at the ego vehicle 105 on social objects 308 such as other vehicles and pedestrians. In example embodiments, the predictive perception unit 502 makes predictions about the world (e.g. the environment ego vehicle 105 is operating in) using information obtained from the collection of on-board sensors 110, 111, and optionally external data sources such as other vehicles located in the environment a vehicle is operating in, or the cloud. The predictions are behavior action conditioned which allow the safety controller 512 to select behavior actions that meet the objectives of the safety controller 512. In this regard, the world is represented to the safety controller 512 as behavior action-conditioned predictions that form an interactive model of the environment that includes information about how different behavior actions can manipulate the environment to minimize some cost function or maximize total reward.

In the context of left turn problem of FIG. 3, the predictive perception unit 502 generates predictions of ego safety and social safety, and these predictions depend on the next action to be taken in the environment. The predictions can be broken down into ego safety zones around the ego vehicle such as in front and behind (overlapping zones can be defined). Social safety zones are also defined around each social object 308, and safety probabilities predicted for these social safety zones with respect to the ego vehicle 105.

In example embodiments, as described above, the predictive perception unit 502 outputs predictions which include a probability of each ego safety zone being free of obstacles, including social objects 308 and static obstacles. Predictive perception unit 502 also outputs a probability of each social safety zone around each social object 308 being free of the ego vehicle 105. Static or non-social objects are ignored in the context of social safety.

In example embodiments, safety controller 512 is configured to maximize ego safety, social safeties, and optionally other goals like comfort, while balancing those goals with reaching the destination quickly and within boundaries such as speed limits. The safety controller 512 is configured to keep ego safety zones free of other obstacles (static and dynamic) while also keeping the safety zones assigned to the social objects 308 free of the ego vehicle 105 in order to improve the ego and social safety of ego vehicle 105 while it operates on the road. The safety controller 512 receives predictions from the predictive perception unit 502 and uses classical fuzzy inference to select a behavior action for the ego vehicle 105 to perform in the environment. The behavior action generated by the safety controller 512 can be provided to the motion planner 1106 a drive control system 150 to effect actuators of the ego vehicle 105 operating within the environment.

Figure 12:
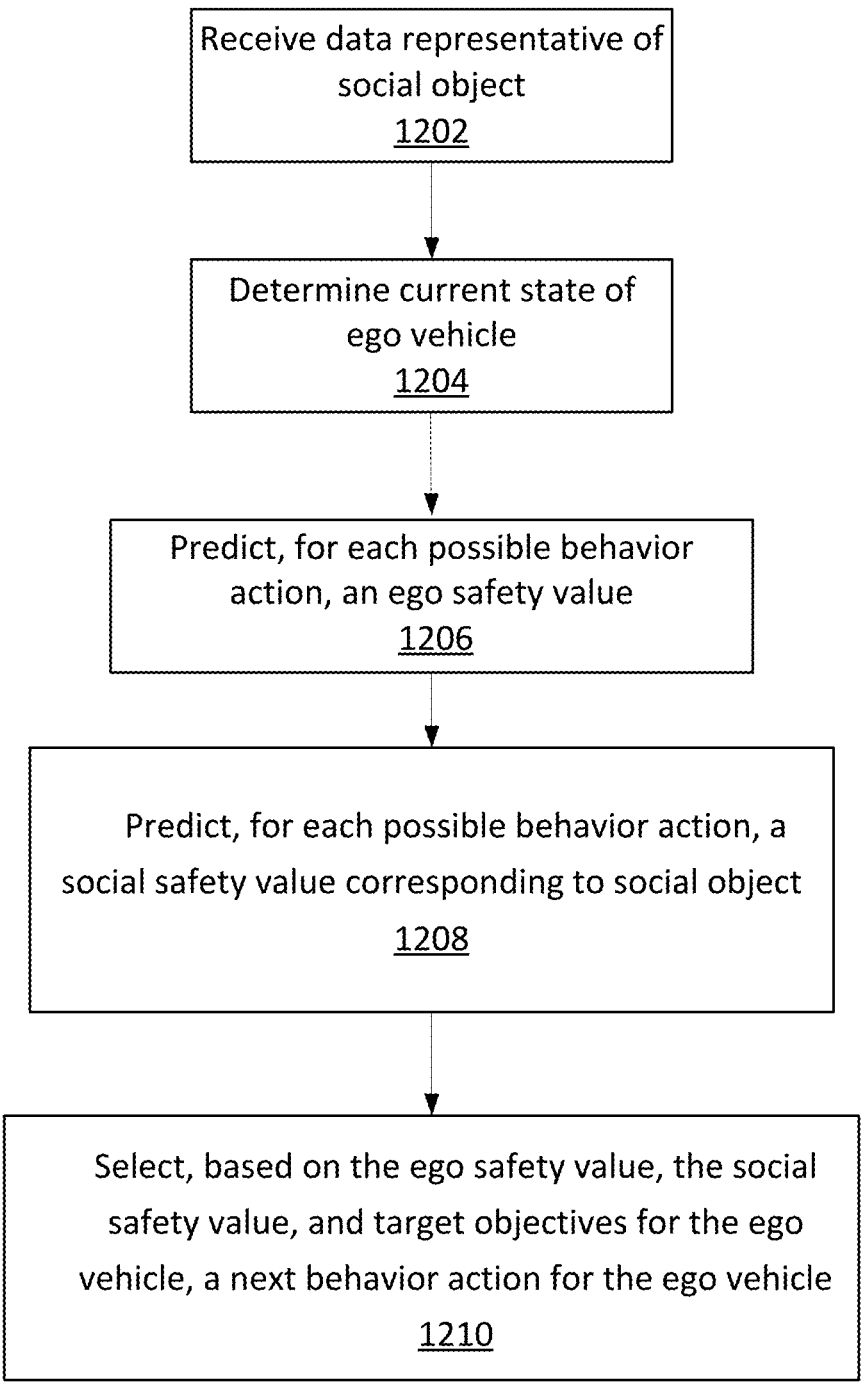
FIG. 12 is a flow diagram of a method of controlling safety of both an ego vehicle and at least one social object in an environment the ego vehicle, according to an example embodiment.

FIG. 12 is a flow diagram further summarizing a method implemented by predictive safety control system 172 for controlling safety of both an ego vehicle and at least one social object in an environment of the ego vehicle, according to an example embodiment. The method includes receiving data representative of at least one social object 308 (Action 1202) and determining a current state of the ego vehicle 105 based on sensor data (Action 1204). An ego safety value is predicted corresponding to the ego vehicle, for each possible behavior action in a set of possible behavior actions, based on the current state (Action 1206). A social safety value corresponding to the at least one social object in the environment of the ego vehicle 105 is predicted, based on the current state, for each possible behavior action (Action 1208). A next behavior action for the ego vehicle 105 is selected, based on the ego safety values, the social safety values, and one or more target objectives for the ego vehicle 105 (Action 1210).

In at least some example embodiments, for each possible behavior action the ego safety value indicates a probability that an obstacle will not be located in an ego safety zone 310 of the ego vehicle 105 if the possible behavior action is performed by the ego vehicle 105 and the target policy followed thereafter. The social safety value indicates a probability, for the at least one social object 308, that the ego vehicle 105 will not be located in a social safety zone 312 of the social object 308 if the possible behavior action is performed by the ego vehicle 105 and the target policy followed thereafter.

In at least some example embodiments, in Action 1202, the data received includes data representative of a plurality of social objects 308 in the environment the ego vehicle 105. The method includes, for each possible behavior action, predicting a respective social safety value for each of the plurality of social objects 308, each social safety value indicating a probability that the ego vehicle 105 will not be located in a respective social safety zone 312 of the respective social object 308 if the possible behavior action is performed by the ego vehicle 105 and the target policy followed thereafter.

In some examples embodiments, determining the current state (Action 1204) comprises determining a velocity and direction of the ego vehicle 105, and a velocity, direction and position of each of the plurality of social objects 308.

In some example embodiments, predicting the ego safety value for each possible behavior action (Action 1206) is performed by a general value function (GVF) implemented by a trained neural network. Predicting the social safety value for each possible behavior action for each of the plurality of social objects (Action 1208) is performed by a further GVF implemented by a trained neural network.

In example embodiments, the ego safety zone includes a physical space that includes and extends beyond the ego vehicle 105 in a direction of travel of the ego vehicle 105, and the social safety zone for a social object 308 includes and extends beyond the social object 308 in a direction of travel of the social object 308.

In further example embodiments, for each possible behavior action, the social safety value corresponds to a plurality of social objects 308 in the environment of the ego vehicle 105, the social safety value indicating a probability that the ego vehicle 105 will not be located in a respective social safety zone of any of the social objects 308 if the possible behavior action is performed by the ego vehicle 105 and the target policy followed thereafter.

In some example embodiments, selecting the behavior action (Action 1202) includes performing fuzzification of the ego safety value and the social safety value predicted for each of the possible behavior actions by mapping each of the ego safety values and the social safety values to a respective truth value; applying fuzzy inference on the truth values to generate a goal fuzzy set; and defuzzifying the goal fuzzy set to select the behavior action for the ego vehicle.

Alternative Embodiments of Predictive Safety Control System

In the example embodiment described above, predictive perception unit 502 includes a social object detector 514 that provides a social object state $o^i_t$ for each detected social object. However, in an alternative example embodiment, social object detector 514 is omitted and the state for each detected social object is not explicitly provided to the social safety predictor module 506. Rather, the social safety predictor GVF $f_{social}$ is configured to map social object safety from sensor data alone (e.g. from state data $S_{t,env}$, without addition state data $o^i_t$ from the social object detector). In such embodiments, social object detector 514 may still be used during training. However, instead of generating $N_t^{obj}$ social safety predictions, only one social safety prediction is produced per action by social safety predictor module 506. In this way, the social safety predictor module 506 does not depend on an object detector 514 once deployed on an autonomous vehicle (e.g., the ego vehicle 105).

In this alternative embodiment, instead of equation (10), the predictive state $p_t$ at time t is represented as:

$$p_t(\hat{a}_t, z_{ego}, z_{social}) = [p_t^{comfort}(\hat{a}_t), p_t^{ego}(\hat{a}_t, z_{ego}), p_t^{social}(\hat{a}_t, z_{social})] \quad (25)$$

for each behavior action available and ego and social safety zones respectively. In the presently described embodiment, only one ego safety zone and one social safety zone are considered, namely the zones are in the direction of travel for the ego vehicle and in the direction of travel for the social objects respectively (regardless of whether the direction of travel is forward or in-reverse).

For training purposes, the cumulants used for training the ego safety GVF $f_{ego}$ 604 and the ego comfort GVF $f_{comfort}$ 608 are the same as those defined above. However, the cumulant definition for $c_t^{social}$ set out in equation (22) above for training social safety GVF $f_{social}$ 606 is replaced by a definition that employs a single cumulant for all objects detected. There are many ways to do this: one way is to use a logical and operator on all the social safety values, i.e:

$$c_t^{social} = \prod_{\forall o \in O} socialsafe(s_t, o, h_{pref}^{safe}, z_{social})(1-\gamma) \quad (26)$$

Another approach is to calculate the percentage of social objects that are safe:

$$c_t^{social} = \frac{1}{N_t^{obj}} \sum_{\forall o \in O} socialsafe(s_t, o, h_{pref}^{safe}, z_{social})(1-\gamma) \quad (27)$$

The latter (e.g. equation (27)) may be more challenging to train because it is more common for vehicles to be social safe than ego safe (the reason is because the ego vehicle 105 has more control over its own safety than social safety and therefore the cumulants for (27) may not vary that much). This means that the training of the ego and social safety predictors still depends on the detection of all the objects in the scene. However, the GVF $f_{social}$ 606 is learning to predict without relying on an object to be detected explicitly when the solution is deployed on a vehicle. The function mapping for the social safety prediction is therefore:

$$f_{social} : S \times A \times Z \quad (3)$$

Learning this function mapping, may, in some embodiments, enable social safety predictor GVF $f_{social}$ 606 to identify social threats without actually performing object detection explicitly.

The safety controller 512 of the first embodiment is modified so that the goal fuzzy set is determined by:

$$G[\hat{a}_t] = m_{comfort}[\hat{a}_t] \wedge \left( \bigwedge_{\forall z_{ego} \in Z_{ego}} m_{ego}[\hat{a}_t | z_{ego}] \right) \wedge \quad (29)$$
$$\left( \bigwedge_{\forall z_{social} \in Z_{social}} m_{social}(\hat{a}_t | z_{social}) \right) \text{ where}$$

$m_{social}(\hat{a}_t | z_{social})$ is the membership of the truth value of social (30)
safety and $m_{social}[\hat{a}_t | z_{social}] = SAFE_{social}(p_{social}[\hat{a}_t | z_{social}])$ As noted above, this alternative removes the need for social object detector 514 post training when predictive safety control system 172 is deployed on an autonomous vehicle (e.g., the ego vehicle 105). The social safety predictor GVF $f_{social}$ 606 can be trained to identify objects that threaten social safety implicitly from LIDAR data representative of a point cloud or image data rather than passing the object parameters explicitly to the social safety predictor GVF $f_{social}$ 606. This has the advantage of being able to learn to predict social safety in environments where very accurate object detection may be available without the need for real-time object detection constraints. The social safety predictor GVF $f_{social}$ 606 can then be deployed in a real-time predictive safety control system 172 without needing an on-line object detector 514 which may sacrifice realtime accuracy by introducing latency.

Further Example Embodiments

Although described herein as a system integrated into the ADAS 166 or the ADS 170, in example embodiments, predictive safety control system 172 can be a standalone system that is used to record information and provide feedback. In some example embodiments, the predictive safety control system 172 could be used in a passive safety system that provides a monitoring and alert module that issues driver guidance. For example embodiments, in the case of a human driver controlled vehicle, the output of the safety controller 512 may be used to trigger a message to the driver, for example a visual and/or audible message to "TURN LEFT". In this regard, predictive safety control system 172 can be a stand-alone system or may be integrated into an autonomous driving system (i.e., the ADAS 166 or the ADS 170).

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Separate boxes or illustrated separation of functional elements of illustrated systems, modules and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for controlling an ego vehicle in an environment that the ego vehicle and a social object are is-operating in, the method comprising:
    determining a current state of the ego vehicle based on sensor data obtained from a plurality of sensors of the ego vehicle, the current state including data about (i) operating state of the ego vehicle and (ii) obstacles in the environment including the social object;
    predicting, based on the current state, for each possible behavior action of the ego vehicle in a set of possible behavior actions of the ego vehicle, an ego safety value indicating a probability that an ego safety zone of the ego vehicle will be free of obstacles if the possible behavior action is performed by the ego vehicle, wherein the ego safety zone comprises a physical space that includes and extends beyond the ego vehicle in a direction of travel of the ego vehicle;
    predicting, based on the current state, for each possible behavior action of the ego vehicle in the set of possible behavior actions, a social safety value corresponding to the social object, the social safety value for each possible behavior action indicating a probability that the ego vehicle will not be located in a social safety zone of the social object if the possible behavior action is performed by the ego vehicle, wherein the social safety zone comprises a physical space that includes and extends beyond the social object in a direction of travel of the social object;
    selecting, based on the ego safety values, the social safety values, and one or more target objectives for the ego vehicle, a next behavior action for the ego vehicle to keep the obstacles out of the ego safety zone and to keep the ego vehicle out of the social safety zone of the social object;
    determining a planned trajectory based on the selected next behavior action for the ego vehicle; and
    controlling a drive control system of the ego vehicle to implement the planned trajectory.

2. The method of claim 1 wherein the data about obstacles in the environment comprises data representative of a plurality of further social objects in addition to the soda object, the method including, for each possible behavior action, predicting a respective social safety value for each of the further social objects, each respective social safety value for each further social object indicating a probability that the ego vehicle will not he located in a respective soda safety zone of the respective further social object if the possible behavior action is performed by the ego vehicle.

3. The method of claim 2 wherein determining the current state comprises determining a velocity and direction of the ego vehicle, and a velocity, direction and position of the social object and each of the plurality of further social objects.

4. The method of claim 2 wherein predicting the ego safety value for each possible behavior action is performed by a general value function (GVF) implemented by a first trained neural network; and predicting the social safety value for each possible behavior action for the social object and each of the plurality of further social objects is performed by a further GVF implemented by a second trained neural network, wherein the first and second trained neural network have each been trained to incorporate a target policy of the ego vehicle.

5. The method of claim 1 wherein a size of one or both of the ego safety zone and the social safety zone is based on the current state.

6. The method of claim 1 wherein, for each possible behavior action, the social safety value corresponds to a plurality of social objects in the environment of the ego vehicle, the social safety value indicating a probability that the ego vehicle will not be located in a respective social safety zone of any of the social objects if the possible behavior action is performed by the ego vehicle.

7. The method of claim 1 wherein selecting the next behavior action for the ego vehicle comprises:
    performing fuzzification of the ego safety value and the social safety value predicted for each of the possible behavior actions by mapping each of the ego safety values and the social safety values to a respective truth value;
    applying fuzzy inference on the truth values to generate a goal fuzzy set; and
    defuzzifying the goal fuzzy set to select the next behavior action for the ego vehicle.

8. The method of claim 1 further comprising, for each possible behavior action, predicting, based on the current state, an ego comfort value corresponding to an acceleration of the ego vehicle, and wherein selecting the next behavior action for the ego vehicle is also based on the ego comfort values predicted for each possible behavior action.

9. A system for controlling an ego vehicle in an environment that the ego vehicle and a social object are operating in, the system comprising:

one or more processor systems;
a memory storing machine-executable instructions which, when executed by the one or more processor systems, cause the system to:
determine a current state based on sensor data obtained from a plurality of sensors of the ego vehicle, the current state including data about (i) operating state of the ego vehicle and (ii) obstacles in an environment of the ego vehicle, including a social object;
predict, based on the current state, for each possible behavior action of the ego vehicle in a set of possible behavior actions, an ego safety value, indicating a probability that an ego safety zone of the ego vehicle will be free of obstacles if the possible behavior action is performed by the ego vehicle, wherein the ego safety zone comprises a physical space that includes and extends beyond the eco vehicle in a direction of travel of the ego vehicle;
predict, based on the current state, for each of the possible behavior actions of the ego vehicle in the set of possible behavior actions, a social safety value corresponding to at the social object, the social safety value for each possible behavior action indicating a probability that the ego vehicle will not be located in a social safety zone of the social object if the possible behavior action is performed by the ego vehicle, wherein the social safety zone comprises a physical space that includes and extends beyond the social object in a direction of travel of the social object;
select, based on the ego safety values, the social safety values predicted for each of the possible behavior actions, and one or more target objectives, a next behavior action for the ego vehicle to keep the obstacles out of the ego-vehicle's safety zone and keep the ego-vehicle out of the safety zone of the social object;
determine a planned trajectory based on the selected next behavior action for the ego vehicle; and
send the planned trajectory to a drive control system of the ego vehicle for implementation of the planned trajectory.

10. The system of claim 9 wherein the data about obstacles includes data representative of a plurality of further social obstacles in addition to the social obstacle, and the machine-executable instructions, when executed by the one or more processor systems, cause the system to predict, for each possible behavior action, a respective social safety value for each of the plurality of further social objects in the environment of the ego vehicle, each respective social safety value for each further social object indicating a probability that the ego vehicle will not be located in a respective social safety zone of the respective further social object if the possible behavior action is performed by the ego vehicle.

11. The system of claim 10 wherein the current state comprises velocity and direction of the ego vehicle, and a velocity, direction and position of the social object and each of the plurality of further social objects.

12. The system of claim 11 wherein the machine-executable instructions, when executed by the one or more processor systems, cause the system to:
predict the ego safety values using a general value function (GVF) implemented by a first trained neural network; and predict the social safety values for the social object and each of the plurality of further social objects, using a further GVF implemented by a second trained neural network, wherein the first and second trained neural network have each been trained to incorporate a target policy of the ego vehicle.

13. The system of claim 9 wherein a size of one or both of the ego safety zone and the social safety zone is based on the current state.

14. The system of claim 9 wherein, for each possible behavior action, the social safety value corresponds to a plurality of social objects in the environment of the ego vehicle, the social safety value indicating a probability that the ego vehicle will not be located in a respective social safety zone of any of the social objects if the possible behavior action is performed by the ego vehicle.

15. The system of claim 9 wherein the machine-executable instructions, when executed by the one or more processor systems, cause the system to:
select the next behavior action for the ego vehicle by:
performing fuzzification of the ego safety value and the social safety value predicted for each of the possible behavior actions by mapping each of the ego safety values and the social safety values to a respective truth value;
applying fuzzy inference on the truth values to produce a goal fuzzy set; and
defuzzifying the goal fuzzy set to select the next behavior action for the ego vehicle.

16. The system of claim 9 wherein the machine-executable instructions, when executed by the one or more processor systems, further cause the system to:
predict, based on the current state, for each possible behavior action, an ego comfort value corresponding to an acceleration of the ego vehicle, and wherein selection of the next behavior action for the ego vehicle is also based on the ego comfort values predicted for each possible behavior action.

17. A non-transitory computer-readable medium storing machine-executable instructions which, when executed by one or more processor systems of a system for controlling an ego vehicle in an environment that the ego vehicle and a social object are operating in, cause the system to:
determine a current state of the ego vehicle based on sensor data obtained from a plurality of sensors of the ego vehicle, the current state including data about (i) operating state of the ego vehicle and (ii) obstacles in the environment including the social object;
predict, based on the current state, for each possible behavior action of the ego vehicle in a set of possible behavior actions of the ego vehicle, an ego safety value indicating a probability that an ego safety zone of the ego vehicle will be free of obstacles if the possible behavior action is performed by the ego vehicle, vs/herein the ego safety zone comprises a physical space that includes and extends beyond the ego vehicle in a direction of travel of the ego vehicle;
predict, based on the current state, for each possible behavior action of the ego vehicle in the set of possible behavior actions, a social safety value corresponding to the social object, the social safety value for each possible behavior action indicating a probability that the ego vehicle will not be located in a social safety zone of the social object if the possible behavior action is performed by the ego vehicle, wherein the social safety zone comprises a physical space that includes and extends beyond the social object in a direction of travel of the social object;
selecting, based on the ego safety values, the social safety values, and one or more target objectives for the ego vehicle, a next behavior action for the ego vehicle to keep the obstacles out of the ego safety zone and to keep the ego vehicle out of the social safety zone of the social object;

determine a planned trajectory based on the selected next behavior action for the ego vehicle; and send the planned trajectory to a drive control system of the ego vehicle for implementation of the planned trajectory.

* * * * *

UNITED STATES PATENT AND TRADEMARK OFFICE
CERTIFICATE OF CORRECTION

PATENT NO. : 11,364,936 B2
APPLICATION NO. : 16/803386
DATED : June 21, 2022
INVENTOR(S) : Daniel Mark Graves It is certified that error appears in the above-identified patent and that said Letters Patent is hereby corrected as shown below:

In the Specification

In Column 24, Line 7: "the future as described in equation, is a vector that"
Should read -- the future as described in equation 18, is a vector that --.

In Column 25, Line 52: "For each ego zone •z $\in Z_{ego}$, calculate Ego safety predict-"
Should read -- For each ego zone $\forall z \in Z_{ego}$, calculate Ego safety predict- --.

Signed and Sealed this
Twentieth Day of December, 2022

Katherine Kelly Vidal
*Director of the United States Patent and Trademark Office*